(12) United States Patent
Kawashima et al.

(10) Patent No.: US 8,441,713 B2
(45) Date of Patent: May 14, 2013

(54) ELECTROPHORETIC LIQUID AND DISPLAY DEVICE USING ELECTROPHORETIC LIQUID

(75) Inventors: Ikue Kawashima, Kanagawa (JP); Masahiro Masuzawa, Chiba (JP); Masahiro Yanagisawa, Kanagawa (JP); Yoshihisa Naijo, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 92 days.

(21) Appl. No.: 13/056,840

(22) PCT Filed: Aug. 4, 2009

(86) PCT No.: PCT/JP2009/064080
§ 371 (c)(1),
(2), (4) Date: Jan. 31, 2011

(87) PCT Pub. No.: WO2010/021256
PCT Pub. Date: Feb. 25, 2010

(65) Prior Publication Data
US 2011/0134508 A1  Jun. 9, 2011

(30) Foreign Application Priority Data

Aug. 20, 2008  (JP) .................................. 2008-211421
Mar. 18, 2009  (JP) .................................. 2009-065606

(51) Int. Cl.
*G02B 26/00* (2006.01)

(52) U.S. Cl.
USPC ........................................................ 359/296

(58) Field of Classification Search .................. 359/296; 345/107, 105; 430/32, 34, 38; 204/450, 204/600; 252/301.16, 582, 583
See application file for complete search history.

(56) References Cited

U.S. PATENT DOCUMENTS

| 6,864,875 B2 | 3/2005 | Drzaic et al. | |
| 7,034,987 B2 * | 4/2006 | Schlangen | 345/107 |
| 7,075,502 B1 | 7/2006 | Drzaic et al. | |
| 7,889,420 B2 * | 2/2011 | Gibson | 359/296 |
| 2002/0051876 A1 | 5/2002 | Katase | |
| 2003/0231162 A1 | 12/2003 | Kishi | |
| 2004/0070554 A1 | 4/2004 | Katase | |
| 2004/0252361 A1 | 12/2004 | Machida et al. | |
| 2004/0263947 A1 | 12/2004 | Drzaic et al. | |
| 2007/0268245 A1 | 11/2007 | Sugita et al. | |
| 2009/0268274 A1 | 10/2009 | Masuzawa et al. | |

FOREIGN PATENT DOCUMENTS

| JP | 2001-83912 | 3/2001 |
| JP | 2001-290444 | 10/2001 |
| JP | 2002-511607 | 4/2002 |
| JP | 2004-20818 | 1/2004 |
| JP | 2005-3964 | 1/2005 |
| JP | 2007-310182 | 11/2007 |
| JP | 2009-9092 | 1/2009 |

\* cited by examiner

OTHER PUBLICATIONS

International Search Report and Written Opinion in PCT/JP2009/064080.

*Primary Examiner* — Tuyen Tra
(74) *Attorney, Agent, or Firm* — Cooper & Dunham LLP

(57) ABSTRACT

An electrophoretic liquid is disclosed that includes first particles that have the property of scattering light over an entire visible range and are positively or negatively charged; second particles that have the property of absorbing light of a specific wavelength range in the visible range and scattering light of ranges other than the specific wavelength range and are charged to a polarity opposite to that of the first particles; and a dispersion medium that has the property of allowing the light of the specific wavelength range absorbed by the second particles to pass through and absorbing the light of the ranges other than the specific wavelength range. In the electrophoretic liquid, the first particles and the second particles are dispersed in the dispersion medium.

14 Claims, 12 Drawing Sheets

FIRST STATE

SECOND STATE

ELECTROPHORETIC LIQUID AND DISPLAY DEVICE USING ELECTROPHORETIC LIQUID

TECHNICAL FIELD

The present invention relates to electrophoretic liquids and display devices such as electronic dictionaries, electronic books, price tags, rewritable message boards, and publicity posters each using the electrophoretic liquids, and, in particular, to a reflective display device suitable for displaying color document information.

BACKGROUND ART

As terminals for displaying so-called images such as texts, still images, and moving images, CRTs (cathode-ray tubes) and LCDs (liquid crystal displays) have been widely used.

These devices are capable of instantly displaying and rewriting digital data, but it is hard for users to carry these devices with them at all times. In addition, since these devices are self-luminous, users get eye strain after a prolonged period of operations. Moreover, when these devices are turned off, display of images cannot be maintained. On the other hand, when texts and still images are distributed or stored in the form of a document, they are recorded on a paper medium by a printer. The paper medium has been widely used as a so-called hard copy. When users use the hard copy, they see reflections resulting from multiple scatterings.

Therefore, the paper medium is more excellent in visibility than the self-luminous devices, which reduces eye strain on users. In addition, since the paper medium is light and excellent in handling, users are allowed to read the paper medium in a comfortable position. However, the hard copy is discarded after use. Some hard copies are recycled, but recycling the hard copies requires enormous efforts and costs, which remains an issue in terms of resource saving. Recently, information processing such as document creation has been performed on a computer along with the advance of information equipment, and an opportunity for reading texts on a display terminal has been remarkably increased.

Under such circumstances, there has been a growing need for a paper-like display medium that has advantages of both the display and the hard copy, is rewritable, and is suitable for reading. Recently, attention has been paid to a polymer-dispersed liquid crystal, a bistable cholesteric liquid crystal, an electrochromic device, and a display medium using an electrophoretic device or the like as a display medium that can create reflective and bright display and have a memory property. Particularly, the display medium using the electrophoretic device is excellent in display quality and power consumption at a display operation, and various inventions related to the display medium have been disclosed.

For example, Patent Document 1 proposes a full-color reflective display. The full-color reflective display uses three electrophoretic sub-pixels, and each of the sub-pixels has a capsule including visually-different three types of particles. Furthermore, an individual electrode on the side opposite to a viewing side is composed of plural electrodes, the particles included in the sub-pixel are composed of particles having one through three types of hues, and a dispersion medium for dispersing the particles is transparent, dyed, or colored. Furthermore, the individual electrode is colored as occasion demands, or a color reflective plate is arranged at the rear surface of the transparent individual electrode. This display device is capable of expressing visual display in response to the application of an electric signal to at least one of the capsules.

Note that the content of the invention described in Patent Document 1 includes many things, but it has three particularly important configurations.

First, the first configuration is shown in FIGS. 3F through 3I of Patent Document 1. Taking FIG. 3F as an example, white particles W having a negative charging property and red particles R having a positive charging property are dispersed in a cell of a transparent dispersion medium. In addition, a common electrode 42 is arranged on the viewing side of the cell, and individual electrodes 35 and 45 are arranged at both ends of the cell on the side opposite to the viewing side of the cell. Furthermore, a substrate 60 colored in blue green is arranged beneath the individual electrodes. In this configuration, when a positive voltage is applied to the common electrode 42 and a negative voltage is applied to the individual electrodes 35 and 45, the white particles W move to the side of the common electrode 42, which in turn provides a white view on the viewing side (which corresponds to FIG. 3F of Patent Document 1). Furthermore, when a negative voltage is applied to the common electrode 42 and a positive voltage is applied to the individual electrodes 35 and 45, the red particles R move to the side of the common electrode 42, which in turn provides a red view on the viewing side (which corresponds to FIG. 3G of Patent Document 1). Furthermore, when a ground potential is applied to the common electrode 42, a positive voltage is applied to the individual electrode 35, and a negative voltage is applied to the individual electrode 45, the red particles R move to the side of the individual electrode 45 and the white particles W move to the individual electrode 35. In this case, since the individual electrodes are positioned at both ends of the cell, the white particles W and the red particles R do not move at the center of the cell. Therefore, the color of the substrate 60 is recognized on the viewing side (which corresponds to FIG. 3H of Patent Document 1). Furthermore, FIG. 3I of Patent Document 1 shows the arrangement of three types of the cells having different hues in this configuration. With this configuration, each of the cells can express a white color, the color of the colored particles, and the color of a substrate. However, it is clear from the above description that a black color cannot be expressed. Accordingly, the first configuration is not suitable for a display device that requires a black and white contrast such as text information.

Next, the second configuration is shown in FIG. 3L or FIG. 3M. In the configuration in FIG. 3L, the common electrode 42 is arranged on the viewing side of a region partitioned by the cell, and the individual electrodes 35 and 45 are arranged on the side opposite to the viewing side. The cell 22 contains a suspension fluid 62 colored in blue green in which the positively-charged red particles R and the negatively-charged white particles W are dispersed. In this configuration, the specification describes that the three basic hues recognized on the viewing side include a white state (a first state) in which the white particles W are positioned on the side of the common electrode, a red state (a second state) in which the red particles R are positioned on the side of the common electrode, and a blue green state (a third state) in which the red particles are positioned on the side of the individual electrode 45 and the white particles are positioned on the side of the individual electrode 35, thereby providing a view of the blue green suspension fluid on the viewing side. Furthermore, a configuration in FIG. 3M is composed of a transparent suspension fluid instead of the suspension fluid 62 in FIG. 3L and blue green neutral particles C, but the specification describes that the basic hues recognized on the viewing side are the same as those in FIG. 3L and the three basic hues exist.

When a full-color display is performed, three types of cells or micro-capsules having different colors of the particles and the suspension fluid are regularly arranged side by side with reference to FIG. 3J of Patent Document 1. More specifically, it is presumed that the first cell including the suspension fluid 62 colored in blue green, the positively-charged red particles R, and the negatively-charged white particles W; the second cell including the suspension fluid 62 colored in magenta, the positively-charged green particles G, and the negatively-charged white particles W; and a third cell including the suspension fluid 62 colored in yellow, the positively-charged blue particles B, and the negatively-charged white particles W, are regularly arranged side by side to perform a full-color display. However, in Patent Document 1, only the three types of the hues are capable of being displayed in one cell or one microcapsule. Therefore, even if the three types of the cells or the microcapsules are arranged side by side, an expressible color reproduction range is limited. For example, when a black text is displayed in a white background using the above three types of the cells, the configuration in FIG. 3L or FIG. 3M of Patent Document 1 does not have a hue corresponding to black. Therefore, a black display cannot be made.

Furthermore, if the negatively-charged black particles are used instead of the white particles W in the above configuration, the hue corresponding to black can be made. However, a white display cannot be made in this case. Note that the specification describes that when the suspension fluid colored in blue green or the blue neutral particles C are positioned in the cell or the microcapsule, the positively-charged red particles R are positioned near the individual electrode 45, and the negatively-charged white particles W are positioned near the individual electrode 35, the blue green particles are viewed on the side of the common electrode. This indicates that the suspension fluid or the blue green neutral particles absorb light other than blue green light and reflect the blue green light. Note that as described below, a colored dispersion medium according to an embodiment of the present invention is characterized to absorb light of a specific wavelength range and allow other light to pass through unlike the suspension fluid in Patent Document 1. Although one cell has only the three colors of the basic hues at maximum conventionally, the embodiment of the present invention is allowed to express four colors of basic hues according to this characteristic. This characteristic is an important difference between the embodiment of the present invention and Patent Document 1.

Furthermore, the third configuration is shown in FIG. 3E of Patent Document 1. In this configuration, each of the three sub-pixel capsules 22, 22', and 22" includes white particles 50, 50', and 50", respectively, dispersed in a transparent dispersion fluid. The sub-pixel capsules 22, 22', and 22" include transparent electrodes 42, 42', and 42" arranged on the viewing side; opaque electrodes 30, 30', and 30" arranged on the side opposite to the viewing side and having a small area; transparent electrodes 40, 40', and 40" arranged on the side opposite to the viewing side and having a large area; color filters 60, 60', and 60" arranged beneath the opaque and transparent electrodes; and a reflective substrate 70, respectively. The specification describes that this configuration has two types of basic hues in a first state in which the white particles are positioned on the opaque electrodes 30, 30', and 30" having the small area to express the color of the color filters and in a second state in which the white particles are positioned uniformly in the dispersion medium, positioned near the transparent electrodes 42, 42', and 42" arranged on the viewing side, or positioned near the transparent electrodes 40, 40', and 40" arranged on the side opposite to the viewing side and having the large area to express a white color. Accordingly, in this case also, the configuration does not have a hue corresponding to black. Therefore, a black display cannot be made. Furthermore, if the black particles are used instead of the white particles in the above configuration, the hue corresponding to black can be expressed. However, a white display cannot be made in this case.

Furthermore, Patent Document 2 proposes an electrophoretic device having an electro-optic layer between electrodes. This electro-optic layer includes a dispersion medium as an electro-optic liquid and particles contained in the dispersion medium. The particles are colored in a first color, and the dispersion medium is colored in a second color. The first and second colors are complementary to each other. According to this invention, when the dispersion particles are positioned near the electrode on the viewing side, the hue of the dispersion medium is recognized on the viewing side. On the other hand, when the dispersion particles are positioned near the electrode on the side opposite to the viewing side, light of a specific wavelength range incident from the viewing side is first absorbed by the dispersion medium. Since absorption of light by the dispersion medium and that of light by the dispersion particles are complementary to each other, light of a wavelength that has not been absorbed by the dispersion medium is absorbed by the dispersion particles. Accordingly, no light is reflected to the viewing side, which in turn provides a black view. In this configuration, a black display can be made. However, when it is desired that a white display be made, it is necessary to use the white dispersion particles and the black dispersion medium. Therefore, a color display cannot be made. Furthermore, in this configuration also, only the two types of the hues are capable of being displayed by one cell or one microcapsule. Therefore, even if the three types of the cells or the microcapsules are arranged side by side, an expressible color reproduction range is limited.

In other words, in the two related arts of Patent Documents 1 and 2, the configuration for displaying a white color cannot make a black or color display, and that for displaying a black color cannot make a white display. Accordingly, in the case of document information that requires black and white texts and color information, brightness in white and a black and white contrast are degraded.

Furthermore, Patent Document 3 proposes a method for filling an electrophoretic ink obtained by dispersing two types of particles having different charging properties and different colors in a translucent solvent, in a unit cell. A transparent common electrode is arranged on the viewing side, and laminated upper and lower individual electrodes are arranged on the side opposite to the viewing side. In addition, first and second opening parts each having no electrode are provided on the side opposite to the viewing side. The specification describes that with this configuration, a color absorbed by the two types of the particles, a color absorbed by the negatively-charged particles, a color absorbed by the positively-charged particles, and a color reflected by the individual electrodes can be expressed in one cell. However, this configuration is so complicated because the individual electrodes are vertically laminated to each other and the two opening parts are provided near the individual electrodes. Therefore, when it is assumed that the configuration is driven by TFTs, the structure of the TFTs becomes so complicated, which results in increased manufacturing costs.

Furthermore, Patent Document 4 proposes an electrophoretic display device that has display electrodes formed in multiple layers in such a manner as to laminate unit cells when each unit cell includes one display electrode or arrange them one on another toward an observer when each unit cell includes plural display electrodes. Colored electrophoretic particles that are electrophoretic and deposited on the display electrodes are translucent and form a display color by a subtractive color mixing principle for the observer. In this configuration, the two types of the cells having different hues are laminated to each other, thereby making it possible to express a full color using the subtractive color mixing principle. However, since this configuration requires the laminated structure of the display electrodes, it has specific disadvantages in practical use, such as (1) increased manufacturing costs due to a complicated device configuration, (2) interruption of light occurring when the TFTs are not transparent because the TFTs are required for each layer so as to drive the display device by the TFTs, and (3) a complicated display method because the transparent electrode on the viewing side is divided.

As described above, in the related arts, the three types of the hues can be expressed by one cell or one microcapsule at most. Therefore, even if the three types of the cells having different hues are arranged side by side, an expressible color reproduction range is limited.

Furthermore, in the case of the configuration in which the two types of the cells are laminated to each other and the configuration in which the individual electrodes are laminated to each other, the structure of the display device becomes complicated. Furthermore, the configuration in which the two types of the cells are laminated to each other is not suitable for driving the TFTs.

The present invention has been made in view of the problems residing in the above related arts and may provide an electrophoretic liquid that increases the number of basic hues that can be expressed by one type of liquid and expands an expressible color reproduction range.

Also, the present invention may provide a display device that realizes both brightness and an expanded color reproduction range with a simple configuration as a reflective display device using the electrophoretic liquid. Moreover, the present invention may provide a display device using an electrophoretic liquid that is capable of expressing a bright white color and a high density black color and suitable for displaying texts even when a color display is made using a method for arranging three types of cells having different hues, and may provide a reflective display device that has an expanded color reproduction range compared with a conventional case in which three types of cells having different hues are arranged side by side even when a color display is made.

In a separately-filed application JP-A-2009-9092, the applicant has proposed an electrophoretic liquid (hereinafter referred to as an invention A) in which three types of dispersion particles having different optical properties and charging properties are dispersed in a solvent. In the electrophoretic liquid, the first dispersion particles have no charge, the second dispersion particles are positively-charged electrophoretic particles, and the third dispersion particles are negatively-charged electrophoretic particles. Specifically, the first dispersion particles having no charge are colored in white, the second positively-charged dispersion particles are colored in any of cyan, yellow, and magenta, and the third negatively-charged dispersion particles are colored in black. When a full-color display is made, three types of cells having different colors of the second dispersion particles are regularly arranged side by side to combine the hues of the three types of the cells with each other. Thus, a desired color can be expressed. This invention can express not only the hues of a white display and a black display but also a color hue unlike Patent Documents 1 and 2. However, in the invention A, the three types of the hues are capable of being displayed in one cell. Therefore, even if the three types of the cells or the microcapsules are arranged side by side, an expressible color reproduction range is limited. For example, when a red hue is expressed, red dispersion particles do not originally exist. Therefore, the red hue is expressed when the yellow particles (that absorb light of a wavelength of 400 nm through 500 nm) and the magenta particles (that absorb light of a wavelength of 500 nm through 600 nm), which absorb part of light of a wavelength of 400 nm through 600 nm for absorbing red light, are positioned at the electrode on the viewing side.

However, since it is desired that light of a wavelength for absorbing red be ideally absorbed by all the three types of the cells, only an extremely light red color can be expressed. Similarly, when a green color and a blue color are expressed, only an extremely light green color and an extremely light blue color can be expressed. On the other hand, when a magenta hue is expressed, a cell including the dispersion particles having the magenta hue expresses the magenta hue, but a cell including the dispersion particles having the yellow hue and a cell including the dispersion particles having the cyan hue cannot express the magenta hue. Therefore, a white or black color must be expressed. Accordingly, an extremely light magenta or a blackened magenta is necessarily expressed as a whole. Similarly, when a cyan color and a yellow color are expressed, only an extremely light cyan color, an extremely light yellow color, a blackened cyan color, and a blackened yellow color can be expressed.

Patent Document 1: JP-A-2002-511607
Patent Document 2: JP-A-2001-290444
Patent Document 3: JP-A-2007-310182
Patent Document 4: JP-A-2004-20818

BRIEF SUMMARY

According to an aspect of this disclosure, there is provided an electrophoretic liquid including first particles that have the property of scattering light over an entire visible range and are positively or negatively charged; second particles that have the property of absorbing light of a specific wavelength range in the visible range and scattering light of ranges other than the specific wavelength range and are charged to a polarity opposite to that of the first particles; and a dispersion medium that has the property of allowing the light of the specific wavelength range absorbed by the second particles to pass through and absorbing the light of the ranges other than the specific wavelength range. In the electrophoretic liquid, the first particles and the second particles are dispersed in the dispersion medium.

According to another aspect, there is provided an electrophoretic liquid including first particles that have the property of scattering light over an entire visible range and positively or negatively charged; second particles that have the property of absorbing light of a specific wavelength range in the visible range and are charged to a polarity opposite to that of the first particles; third particles that have the property of scattering light over the entire visible range and are charged to a polarity the same as that of the second particles; and a dispersion medium that has the property of allowing the light of the specific wavelength range absorbed by the second particles to pass through and absorbing light of ranges other than the specific wavelength range. In the electrophoretic liquid, the first particles, the second particles, and the third particles are dispersed in the dispersion medium.

According to still another aspect of this disclosure, there is provided a display device including plural cells that are arranged on a supporting body or arranged in the supporting body and encapsulate the electrophoretic liquid as described above; and opposing electrodes to which a voltage or a current is applied so that the first particles and the second particles are moved in the cells.

According to still another aspect, there is provided a display device including plural cells that are arranged on a supporting body or arranged in the supporting body and encapsulate the electrophoretic liquid described above; and opposing electrodes to which a voltage or a current is applied so that the first particles, the second particles, and the third particles are moved in the cells.

BEST MODE FOR CARRYING OUT THE INVENTION

As a basic configuration, an electrophoretic liquid according to an embodiment of the present invention includes first particles that have the property of scattering light over an entire visible range and are positively or negatively charged; second particles that have the property of absorbing light of a specific wavelength range in the visible range and scattering light of ranges other than the specific wavelength range and are charged to a polarity opposite to that of the first particles; and a dispersion medium that has the property of allowing the light of the specific wavelength range absorbed by the second particles to pass through and absorbing the light of the ranges other than the specific wavelength range. In the electrophoretic liquid, the first particles and the second particles are dispersed in the dispersion medium.

As a basic configuration, a display device according to the embodiment of the present invention includes plural cells that are arranged on a supporting body or arranged in the supporting body and encapsulate first particles that have the property of scattering light over an entire visible range and are positively or negatively charged; second particles that have the property of absorbing light of a specific wavelength range in the visible range and scattering light of ranges other than the specific wavelength range and are charged to a polarity opposite to that of the first particles; and a dispersion medium that has the property of allowing the light of the specific wavelength range absorbed by the second particles to pass through and absorbing the light of the ranges other than the specific wavelength range. In addition, the display device includes opposing electrodes to which a voltage or a current is applied so that the first particles and the second particles are moved in the cells.

Hereinafter, the configuration of the display device according to the embodiment of the present invention is described with reference to the accompanying drawings.

Figure 1:
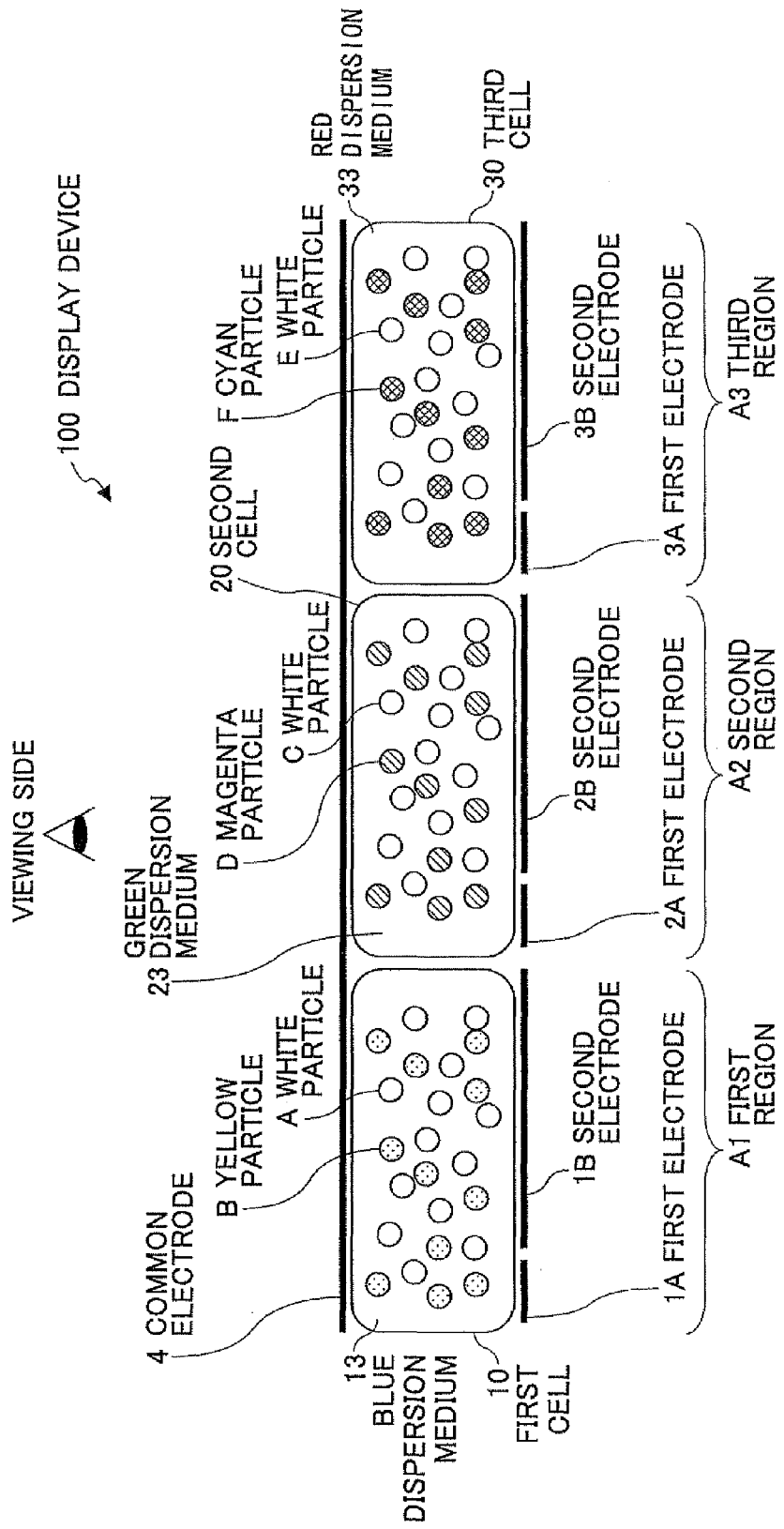
FIG. 1 is a cross-sectional view showing a first configuration of a display device according to an embodiment of the present invention.

A configuration example (first configuration example) according to the embodiment of the present invention is shown in FIG. 1. FIG. 1 is a cross-sectional view showing a first configuration of the display device according to the embodiment of the present invention.

The display device 100 is composed of three display regions (a first region A1, a second region A2, and a third region A3) having different expressible hue ranges.

The first region A1 has a first cell 10 encapsulating A-particles as first particles that have the property of scattering light over an entire visible range and are positively or negatively charged; B-particles as second particles that have the property of absorbing light of a first specific wavelength range in the visible range and scattering light of ranges other than the first specific wavelength range and are charged to a polarity opposite to that of the A-particles; and a dispersion medium that has the property of allowing the light of the first specific wavelength range absorbed by the B-particles to pass through and absorbing other light.

The second region A2 has a second cell 20 encapsulating C-particles as first particles that have the property of scattering light over an entire visible range and are positively or negatively charged; D-particles as second particles that have the property of absorbing light of a second specific wavelength range in the visible range and scattering light of ranges other than the second specific wavelength range and are charged to a polarity opposite to that of the C-particles; and the dispersion medium that has the property of allowing the light of the second specific wavelength range absorbed by the D-particles to pass through and absorbing other light.

The third region A3 has a third cell 30 encapsulating E-particles as the first particles that have the property of scattering light over an entire visible range and are positively or negatively charged; F-particles as the second particles that have the property of absorbing light of a third specific wavelength range in the visible range and scattering light of ranges other than the third specific wavelength range and are charged to a polarity opposite to that of the E-particles; and the dispersion medium that has the property of allowing the light of the third specific wavelength range absorbed by the F-particles to pass through and absorbing other light.

In the configuration example in FIG. 1, the particles A, C, and E are the negatively-charged white particles A, C, and E as the first particles. Furthermore, as the second particles, the particles B are the positively-charged yellow particles B, the particles D are the positively-charged magenta particles D, and the particles F are the positively-charged cyan particles F. The first region A1 includes the dispersion medium (blue dispersion medium 13) that has the property of allowing blue light to pass through and absorbing light other than the blue light. The second region A2 includes the dispersion medium (green dispersion medium 23) that has the property of allowing green light to pass through and absorbing light other than the green light. The third region A3 includes the dispersion medium (red dispersion medium 33) that has the property of allowing red light to pass through and absorbing light other than the red light.

Note that in the configuration example in FIG. 1, the first region A1 (the first cell 10) uses the combination of the white particles A, the yellow particles B, and the blue dispersion medium 13. Furthermore, the second region A2 (the second cell 20) uses the combination of the white particles C, the magenta particles D, and the green dispersion medium 23. Furthermore, the third region A3 (the third cell 30) uses the combination of the white particles E, the cyan particles F, and the red dispersion medium 33.

Furthermore, it is clear from the principle of displaying hues shown in FIGS. 2A through 2D described below that the same effects as those obtained when the configuration in FIG. 1 is used are obtained even if the first region A1 (the first cell 10) uses the combination of the white particles, the blue particles, and the yellow dispersion medium, the second region A2 (the second cell 20) uses the combination of the white particles, the green particles, and the magenta dispersion medium, and the third region A3 (the third cell 30) uses the combination of the white particles, the red particles, and the cyan dispersion medium instead of using the hues in the configuration example in FIG. 1.

Note that the word "cell" used in the claims and the description of the present invention is defined as a "finite space region partitioned by partition walls." Furthermore, the word "dispersion liquid" or the word "electrophoretic liquid" used in the claims and the specification of the present invention is defined as an entire constituent in which the electrophoretic particles contained in the cell are dispersed. The word "dispersion liquid" used in the claims and the description of the present invention is defined as the entire constituent in which the electrophoretic particles contained in the cell are dispersed. Furthermore, the word "dispersion medium" used in the claims and the description of the present invention is defined as part of the dispersion liquid that does not include the electrophoretic particles moved by a current or a voltage. Furthermore, the word "dispersion medium liquid" used in the claims and the description of the present invention is defined as a dispersion liquid that does not include a dispersion agent for dispersing electrophoretic dispersion particles and particles and a charge controlling agent.

Here, as the white particles A, C, and E that are the first particles used in the embodiment of the present invention, solid particles of a metal oxide such as silica dioxide, aluminum oxide, and titanic oxide can be used. Furthermore, the yellow particles B among the second particles serving as coloring particles are yellow-colored particles, and examples of the color of the yellow particles B can include chrome yellow, benzidine yellow, hanza yellow, napthtol yellow, molybdenum orange, quinoline yellow, tartrazine, or the like. Furthermore, the magenta particles D are magenta-colored particles, and examples of the color of the magenta particles D can include Rhodamine 6G Lake, dimethyl quinacridone, Watching Red, Rose Bengal, Rhodamine B, Alizarin Lake, or the like. Furthermore, the cyan particles F are cyan-colored particles, and examples of the color of the cyan particles F can include phthalocyanine blue, methylene blue, victoria blue, methyl violet, alinin blue, ultramarine blue, or the like.

Furthermore, the red particles are red-colored particles, and examples of the color of the red-colored particles can include quinacridone red, diketopyrrolopyrrole, naphthol red, or the like. Furthermore, the green particles are green-colored particles, and examples of the color of the green-colored particles can include phthalocyanine or the like.

Furthermore, the blue particles are blue-colored particles, and examples of the color of the blue-colored particles can include a blue pigment of a phthalocyanine system, an anthraquinone system, and an indanthrone system.

Note that in order to improve dispersion stability in the dispersion medium, a graft chain of a polymer component compatible with the dispersion medium is preferably applied to the front surface of the white or colored particles.

In case that the polymer component is formed at the front surface of the particles, a known method may be used to apply a functional group that contributes to a polymerization reaction to the front surface of the white or colored particles. In the case of particles such as titanium oxide having a metal oxide surface, the particles are preferably treated with a coupling agent having the functional group that contributes to a polymerization reaction. For example, when a vinyl group is applied to the front surface, the front surface may be reacted with a silane coupling agent having a vinyl group, such as 3-(trimethoxysilyl)propyl methacrylate.

The dispersion medium liquid used in the embodiment of the present invention is preferably a nonpolar organic solvent having a high electric insulating property. Examples of the nonpolar organic solvent include paraffinic hydrocarbon such as pentane, hexane, heptane, octane, nonane, decane, and dodecane; isoparaffinic hydrocarbon such as isohexane, isooctane, and isododecane; alkyl naphthene hydrocarbon such as liquid paraffin, aromatic hydrocarbon such as benzene, toluene, xylene, alkyle benzene, and solvent naphtha; and silicon oil such as dimethyl silicon oil, phenyl methyl silicon oil, dialkyl silicon oil, alkyl phenyl silicon oil, cyclic polydialkyl siloxane, and cyclic polyalkyl phenyl siloxane. Note that the dispersion agent and the charge controlling agent may be further added to the dispersion liquid as occasion demands so as to control the dispersibility of the dispersion particles.

Furthermore, the easiest method for coloring the dispersion medium is to dissolve dye in the dispersion medium liquid. When the dye is used as a method for coloring the dispersion medium, moving of the particles becomes easy and a response speed increases because only two types of particles exist in one cell.

Furthermore, as a red dye for coloring the dispersion medium liquid, "Sudan Red 7B" and "Oil Red EGN" manufactured by Sigma-Aldrich Corporation can be used. Furthermore, as a green dye for coloring the dispersion medium liquid, "Solvent Green 3" produced by Sigma-Aldrich Corporation can be used. Furthermore, as a blue dye for coloring the dispersion medium liquid, "Oil Blue N" produced by Sigma-Aldrich Corporation can be used.

Furthermore, the dispersion medium can also be colored by dispersing neutral or weakly-charged particles that allow light of a specific wavelength range to pass through and absorb light of wavelengths other than the specific wavelength range in the dispersion medium liquid.

For example, with the application of a graft chain to the front surface of known color fine particles, it is possible to easily disperse the particles in the dispersion medium. According to this configuration, when a white color is expressed, the colored dispersion medium may not enter gaps between the white particles positioned on the side of a common electrode 4 as seen from the viewing side. Thus, a white hue having a high color purity can be obtained.

Note that each of the first cell 10, the second cell 20, and the third cell 30 is partitioned by the partition walls to form a prescribed space, and the shapes of the cells 10, 20, and 30 conceptually include a capsule.

Furthermore, the first cell 10, the second cell 20, and the third cell 30 are arranged on a transparent supporting body (not shown) or in a supporting body (not shown). For example, when the cells 10, 20, and 30 are arranged on the supporting body, the supporting body is arranged so as to face the viewing side.

In this case, at the main surface of the supporting body on the side facing the cells 10, 20, and 30 (that is, on the viewing side of the three regions A1, A2, and A3), the transparent common electrode 4 common to the first cell 10, the second cell 20, and the third cell 30 is provided. Furthermore, on the side opposite to the common electrode 4 (the viewing side) via the cells 10, 20, and 30, an individual electrode composed of a first electrode having a small surface area and a second electrode having a large surface area is provided so as to correspond to each of the spaces partitioned as the cells 10, 20, and 30. In FIG. 1, the first region A1 (the first cell 10) includes a first electrode 1A having a small surface area and a second electrode 1B having a large surface area, the second region A2 (the second cell 20) includes a first electrode 2A having a small surface area and a second electrode 2B having a large surface area, and the third region A3 (the third cell 30) includes a first electrode 3A having a small surface area and a second electrode 3B having a large surface area.

In this configuration, the display device 100 can create four basic states depending on the electrode potentials of the first electrode and the second electrode in each of the regions A1, A2, and A3 (the cells 10, 20, and 30). The four states are described below with reference to FIGS. 2A through 2D.

FIGS. 2A through 2D show the hues that can be displayed in the first region A1 (the first cell 10) in FIG. 1.

Figure 2A:
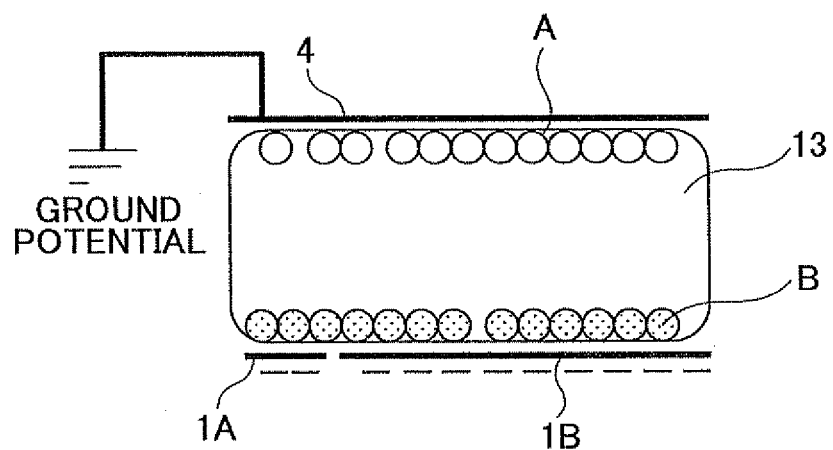
FIGS. 2A through 2D are diagrams showing a first operation state of the display device in FIG. 1.

First, FIG. 2A shows a case in which the potential of the common electrode 4 is maintained at a ground potential and those of the first and second electrodes 1A and 1B are both maintained at a negative potential. Since the white particles A have a negative charge, they are repulsed from the first and second electrodes 1A and 1B and move to the vicinity of the common electrode 4. On the other hand, since the yellow particles B have a positive charge, they are attracted to the first and second electrodes 1A and 1B. As a result, the first region A1 appears white on the viewing side (on the side of the common electrode 4).

Figure 2B:
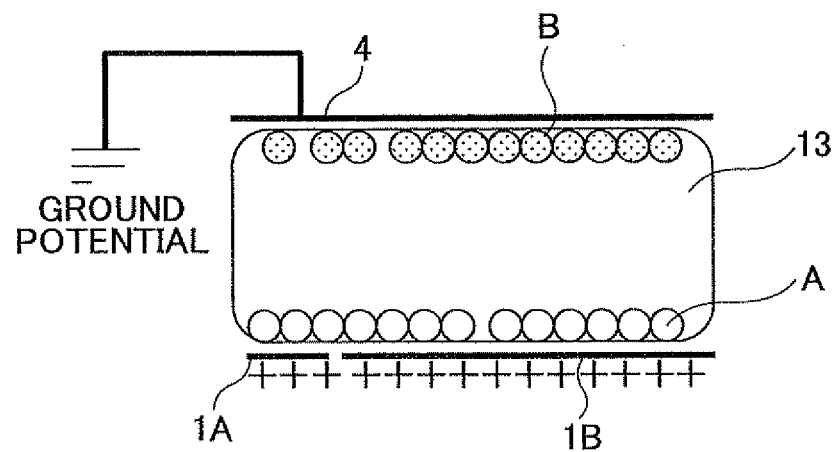

Next, FIG. 2B shows a case in which the potential of the common electrode 4 is maintained at a ground potential and those of the first and second electrodes 1A and 1B are both maintained at a positive potential. Since the white particles A have a negative charge, they are attracted to the first and second electrodes 1A and 1B. On the other hand, since the yellow particles B have a positive charge, they are repulsed from the first and second electrodes 1A and 1B and move to the vicinity of the common electrode 4. As a result, the first region A1 appears yellow on the viewing side (on the side of the common electrode 4).

Figure 2C:
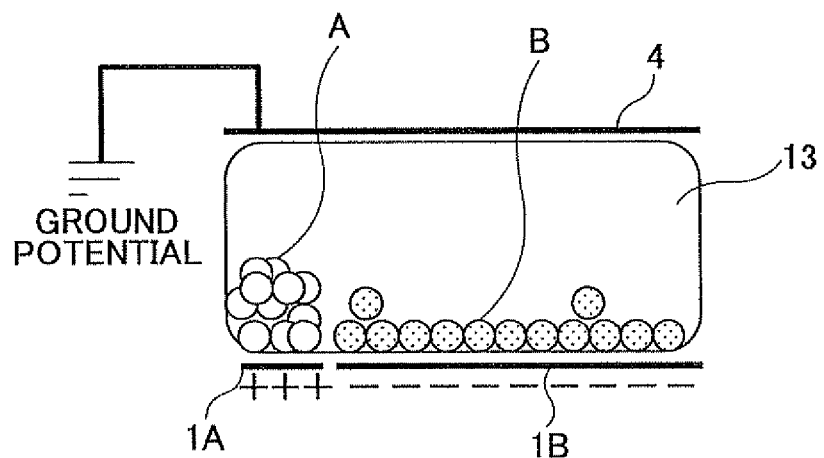

Furthermore, FIG. 2C shows a case in which the potential of the common electrode 4 is maintained at a ground potential, that of the first electrode 1A is maintained at a positive potential, and that of the second electrode 1B is maintained at a negative potential. Since the white particles A have a negative charge, they move to the vicinity of the first electrode 1A. Furthermore, since the yellow particles B have a positive charge, they move to the vicinity of the second electrode 1B. That is, the white particles A and the yellow particles B are both positioned on the side opposite to the viewing side. Accordingly, the light incident from the viewing side is absorbed by the blue dispersion medium 13 and then applied to the white particles A and the yellow particles B. Since the white particles A scatter light of any wavelength, they scatter blue light as light of a wavelength other than the light of the wavelength absorbed by the blue dispersion medium 13. Therefore, the white particles A appear blue on the viewing side. Since the yellow particles B have the property of absorbing blue light, they do not scatter light.

Therefore, the yellow particles B appear black on the viewing side. Here, since the surface area of the second electrode 1B is relatively larger than that of the first electrode 1A, the color originating from the yellow particles B becomes dominant. Therefore, the first region A1 appears almost black on the viewing side (on the side of the common electrode 4) as a whole.

Figure 2D:
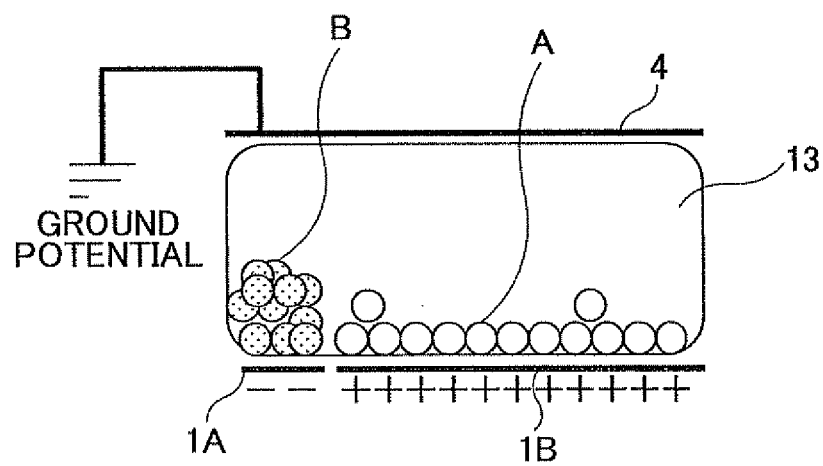

Furthermore, FIG. 2D shows a case in which the potential of the common electrode 4 is maintained at a ground potential, that of the first electrode 1A is maintained at a negative potential, and that of the second electrode 1B is maintained at a positive potential. Since the white particles A have a negative charge, they move to the vicinity of the second electrode 1B.

Since the yellow particles B have a positive charge, they move to the vicinity of the first electrode 1A. That is, the white particles A and the yellow particles B are both positioned on the side opposite to the viewing side. Accordingly, the light incident from the viewing side is absorbed by the blue dispersion medium 13 and then applied to the white particles A and the yellow particles B. Since the white particles A scatter light of any wavelength, they scatter blue light as light of a wavelength other than the light of the wavelength absorbed by the blue dispersion medium 13. Therefore, the white particles A appear blue on the viewing side. Since the yellow particles B have the property of absorbing blue light, they do not scatter light. Therefore, the yellow particles B appear black on the viewing side. Here, since the surface area of the second electrode 1B is relatively larger than that of the first electrode 1A, the color originating from the white particles A becomes dominant. Therefore, the first region A1 appears almost blue on the viewing side (on the side of the common electrode 4) as a whole.

As described above, in the first region A1 (the first cell 10), the potentials of the first and second electrodes 1A and 1B are varied with the potential of the common electrode 4 maintained at a ground potential, whereby the four basic hues of white, yellow, black, and blue colors can be expressed. Furthermore, based on the same principle, in the second region A2 (the second cell 20), the potentials of the first and second electrodes 1A and 1B are varied with the potential of the common electrode 4 maintained at a ground potential, whereby the four basic hues of white, magenta, black, and green colors can be expressed. Furthermore, in the third region A3 (the third cell 30), the potentials of the first and second electrodes are varied with the potential of the common electrode 4 maintained at a ground potential, whereby the four basic hues of white, cyan, black, and red colors can be expressed.

Furthermore, it is also possible to use hues displayed as intermediate states of transitions between the four states of the first through fourth states.

Note that a ratio of the area of the first electrode 1A having the small surface area to that of the second electrode 1B having the large surface area is desirably 1:2 or greater, and more desirably 1:5 or greater. The greater the area ratio is, the higher a black and white contrast becomes.

In the related art, only two or three hues can be basically expressed in one region with the above configuration. Therefore, when three cells having different expressible hues are arranged side by side, an expressible hue range is limited. However, according to the embodiment of the present invention, even with the configuration in which the two types of the particles having the different charge polarities are encapsulated in one cell, the four colors of the hues can be basically expressed in one region. Therefore, it is possible to substantially expand an expressible hue range when the three cells having the different expressible hues are arranged side by side. Furthermore, since the black and white hues are expressed in all the first through third regions A1 through A3 in the four colors of the hues, a black text can be expressed in a white background. Moreover, since each of the regions has the two hues in additions to the white and black colors, the embodiment of the present invention can remarkably expand a color reproduction range compared with the related art disclosed in JP-A-20099092 in which only one hue can be expressed in one region in addition to the white and black colors (the invention A: a display device using an electrophoretic liquid in which three types of dispersion particles having different optical properties and charging properties are dispersed in a solvent. In the electrophoretic liquid, the first dispersion particles have no charge, the second dispersion particles are positively-charged electrophoretic particles, and the third dispersion particles are negatively-charged electrophoretic particles).

For example, as described above, when the red hue is expressed in the invention A, the red dispersion particles do not originally exist.

Therefore, the red hue is expressed by the yellow particles (that absorb light of a wavelength of 400 nm through 500 nm) and the magenta particles (that absorb light of a wavelength of 500 nm through 600 nm) positioned at the electrode on the viewing side, which absorb part of light of a wavelength of 400 nm through 600 nm for absorbing red light. However, it is desired that light of a wavelength for absorbing red light be ideally absorbed by all the three types of the cells. Therefore, a light amount only about one-third of a light amount by which the red hue is ideally expressed is absorbed. Therefore, only an extremely light red color can be expressed. On the other hand, according to the configuration shown in FIG. 1, when it is desired to express the red hue, the first region A1 (the first cell 10) is configured to create a state in which the yellow hue (that absorbs light of a wavelength of 400 nm through 500 nm) is expressed, the second region A2 (the second cell 20) is configured to create a state in which the magenta hue (that absorbs light of a wavelength of 500 nm through 600 nm) is expressed, and the third region A3 is configured to create a state in which the red hue (that absorbs light of a wavelength of 400 nm through 600 nm) is expressed. Thus, a light amount of about two-thirds of the light amount by which the red hue is ideally expressed can be absorbed. Accordingly, the embodiment of the present invention makes it possible to absorb twice as large as the light amount of the invention A, which in turn expresses the red hue close to an ideal one. The same applies to cases when it is desired to express the green and blue hues. Accordingly, it is possible to solve a fundamental problem occurring when the cells having the three types of the hues are arranged side by side, i.e., "absence of a method for clearly expressing black and white colors and a wide color range" and provide a reflective display device suitable for displaying color document information or the like. Furthermore, since it is not necessary to have a laminated structure disclosed in Patent Document 4 (JP-A-2004-20818), the structure of the embodiment can be made simple. Moreover, since it is not necessary to provide a TFT for each layer of the laminated structure, manufacturing costs for the configuration disclosed in Patent Document 4 can be greatly reduced.

Table 1 shows theoretical reflectivity at each wavelength in color display obtained by the display device (FIG. 1) of the embodiment of the present invention and that obtained by the display device of the related art. For each of the three wavelength ranges at 400 through 500 nm, 500 through 600 nm, and 600 through 700 nm, the reflectivity of display colors is evaluated.

Note that substantial reflectivity is different from the theoretical reflectivity due to the size of a cell and electrodes, the light absorption of a transparent conductive film and a cell, and a difference in a manufacturing process in respective configurations of the display devices. Therefore, an "ideal display device" is here defined to have 100% reflectivity at a target wavelength range, based on which a relative evaluation is conducted. In other words, the closer the reflectivity approximates this value, the higher a color reproduction range, brightness in a white color, and a black and white contrast become.

TABLE 1

| | DISPLAY COLOR | | | | | | | | REFLECTIVITY (%) |
| --- | --- | --- | --- | --- | --- | --- | --- | --- | --- |
| | WHITE | | | BLACK | | | RED | | |
| | WAVELENGTH | | | | | | | | |
| | 400 THROUGH 500 nm | 500 THROUGH 600 nm | 600 THROUGH 700 nm | 400 THROUGH 500 nm | 500 THROUGH 600 nm | 600 THROUGH 700 nm | 400 THROUGH 500 nm | 500 THROUGH 600 nm | 600 THROUGH 700 nm |
| IDEAL DISPLAY DEVICE | 100 | 100 | 100 | 0 | 0 | 0 | 0 | 0 | 100 |
| PRESENT INVENTION | 100 | 100 | 100 | 0 | 0 | 0 | 33 | 33 | 100 |
| COMPARATIVE EXAMPLE 1 | 100 | 100 | 100 | 33 | 33 | 33 | 33 | 33 | 100 |
| COMPARATIVE EXAMPLE 2 | 100 | 100 | 100 | 33 | 33 | 33 | 33 | 33 | 100 |
| COMPARATIVE EXAMPLE 3 | 100 | 100 | 100 | 66 | 66 | 66 | 66 | 66 | 100 |
| COMPARATIVE EXAMPLE 4 | 33 | 33 | 33 | 0 | 0 | 0 | 0 | 0 | 33 |
| COMPARATIVE EXAMPLE 5 | 100 | 100 | 100 | 0 | 0 | 0 | 66 | 66 | 100 |
| COMPARATIVE EXAMPLE 6 | 100 | 100 | 100 | 0 | 0 | 0 | 33 | 33 | 100 |
| COMPARATIVE EXAMPLE 7 | 100 | 100 | 100 | 0 | 0 | 0 | 0 | 0 | 100 |

TABLE 1-continued

| | | DISPLAY COLOR | | | | REFLECTIVITY (%) | |
|---|---|---|---|---|---|---|---|
| | | GREEN | | | BLUE | | |
| | | WAVELENGTH | | | | | |
| | | 400 THROUGH 500 nm | 500 THROUGH 600 nm | 600 THROUGH 700 nm | 400 THROUGH 500 nm | 500 THROUGH 600 nm | 600 THROUGH 700 nm |
| | IDEAL DISPLAY DEVICE | 0 | 100 | 0 | 100 | 0 | 0 |
| | PRESENT INVENTION | 33 | 100 | 33 | 100 | 33 | 33 |
| | COMPARATIVE EXAMPLE 1 | 33 | 100 | 33 | 100 | 33 | 33 |
| | COMPARATIVE EXAMPLE 2 | 33 | 100 | 33 | 100 | 33 | 33 |
| | COMPARATIVE EXAMPLE 3 | 66 | 100 | 66 | 100 | 66 | 66 |
| | COMPARATIVE EXAMPLE 4 | 0 | 33 | 0 | 33 | 0 | 0 |
| | COMPARATIVE EXAMPLE 5 | 66 | 100 | 66 | 100 | 66 | 66 |
| | COMPARATIVE EXAMPLE 6 | 33 | 100 | 33 | 100 | 33 | 33 |
| | COMPARATIVE EXAMPLE 7 | 0 | 100 | 0 | 100 | 0 | 0 |

Figure 3:
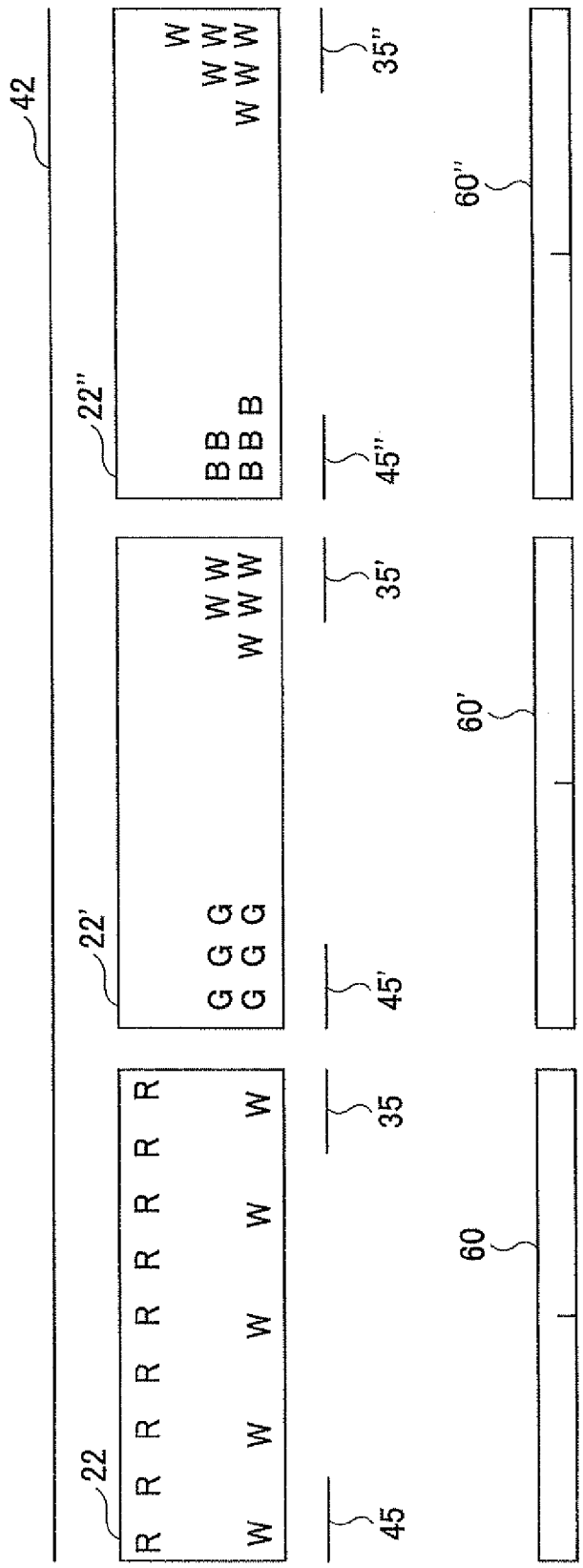
FIG. 3 is a cross-sectional view showing the configuration of the display device in comparative example 1.

Here, the display device in comparative example 1 is the one shown in FIGS. 3F through 3I of Patent Document 1, and the configuration of the display device is as follows. In other words, as shown in FIG. 3, the cells 22, 22', and 22" are arranged side by side in the transparent dispersion medium. In the cell 22, the white particles W having the negative charge property and the red particles R having the positive charge property are dispersed. In the cell 22', the white particles W having the negative charge property and the green particles G having the positive charge property are dispersed. In the cell 22", the white particles W having the negative charge property and the blue particles B having the positive charge property are dispersed. Furthermore, the common electrode 42 is arranged on the viewing side of the cells 22, 22', and 22". Moreover, the individual electrodes 35 and 45 are arranged at both ends of the cell 22 on the side opposite to the viewing side of the cell 22. Furthermore, the individual electrodes 35' and 45' are arranged at both ends of the cell 22' on the side opposite to the viewing side of the cell 22'. Furthermore, the individual electrodes 35" and 45" are arranged at both ends of the cell 22" on the side opposite to the viewing side of the cell 22". Moreover, the substrate 60 colored in blue green, the substrate 60' colored in magenta, and the substrate 60" colored in yellow are arranged beneath the individual electrodes.

Figure 4:
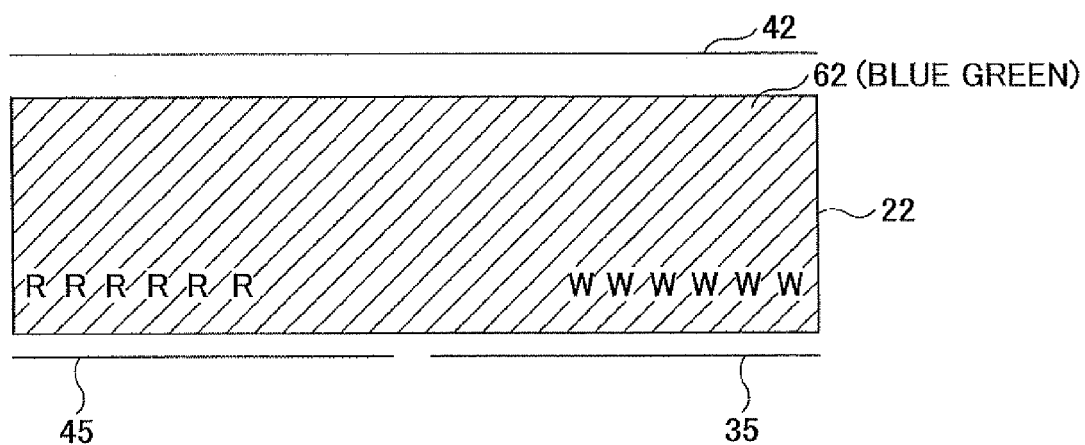
FIG. 4 is a cross-sectional view showing the configuration of a unit cell used in the display device in comparative example 2.

Furthermore, the display device in comparative example 2 is composed of the cells shown in FIGS. 3L and 3M of Patent Document 1 instead of the cells 22, 22', and 22" shown in FIG. 3, and the configuration of the display device is as follows. In other words, as shown in FIG. 4, in a unit cell, the common electrode 42 is arranged on the viewing side of the region partitioned by the cell, and the individual electrodes 35 and 45 are arranged on the other side of the region. In the cell 22, the suspension fluid 62 colored in blue green, the positively-charged red particles R, and the negatively-charged white particles W are dispersed. In comparative example 2, the display device is composed of the cells having this configuration instead of the cells 22, 22', and 22" shown in FIG. 3. In other words, the first cell, the second cell, and the third cell having this configuration are regularly arranged side by side in the display device. The first cell encapsulates the suspension fluid 62 colored in blue green, the positively-charged red particles R, and the negatively-charged white particles W.

The second cell encapsulates the suspension fluid 62 colored in magenta, the positively-charged green particles G, and the negatively-charged white particles W. The third cell encapsulates the suspension fluid 62 colored in yellow, the positively-charged blue particles B, and the negatively-charged white particles W.

Figure 5:
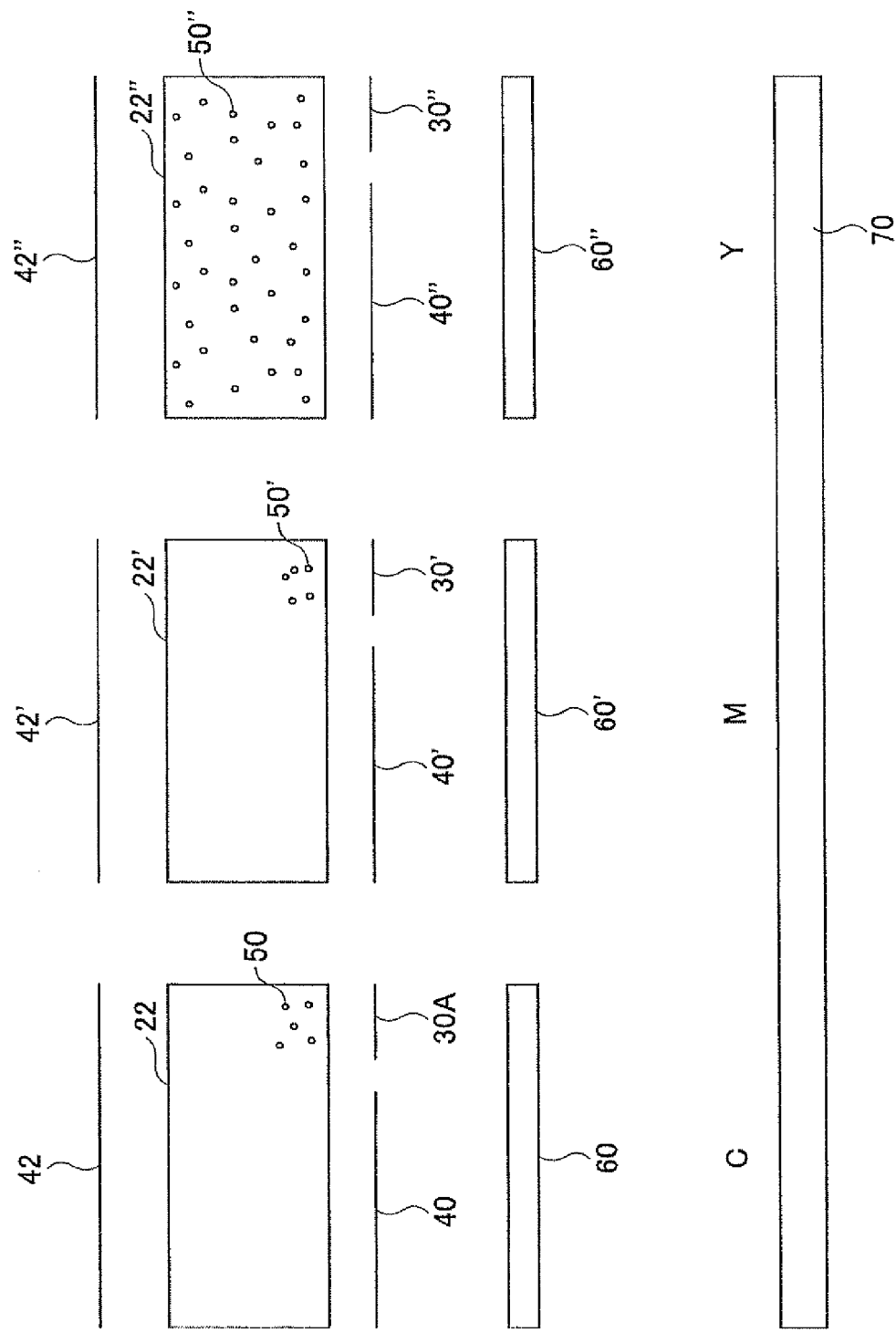
FIG. 5 is a cross-sectional view showing the configuration of the display device in comparative example 3.

Furthermore, the display device in comparative example 3 is composed of the cells shown in FIG. 3E of Patent Document 1, and the configuration of the display device is as follows. In other words, as shown in FIG. 5, the three sub-pixel capsules 22, 22', and 22" of the cells contain the white particles 50, 50', 50", respectively, dispersed in the transparent dispersion fluid. The sub-pixel capsules 22, 22', and 22" have the transparent electrodes 42, 42', and 42" arranged on the viewing side; the opaque electrodes 30A, 30', and 30" arranged on the side opposite to the viewing side and having the small area; the transparent electrodes 40, 40', and 40" arranged on the side opposite to the viewing side and having the large area; the color filters 60, 60', and 60" arranged beneath the opaque and transparent electrodes; and the reflective substrate 70, respectively.

Furthermore, the display device in comparative example 4 is composed of the cells described in table 1 of Patent Document 2, and the configuration of the display device is as follows. In other words, in the electrophoretic device having the electro-optic layer between the electrodes, this electro-optic layer includes the dispersion medium as the electro-optic liquid and the particles contained in the dispersion medium. The particles are colored in the first color, and the dispersion medium is colored in the second color. The first and second colors are complementary to each other. Here, the cell for displaying the color of (R) red containing the red particles and the cyan dispersion medium, the cell for displaying the color of (G) green containing the green particles and the magenta dispersion medium, and the cell for displaying the color of (B) blue containing the blue particles and the yellow dispersion medium are arranged side by side in the display device.

Figure 6:
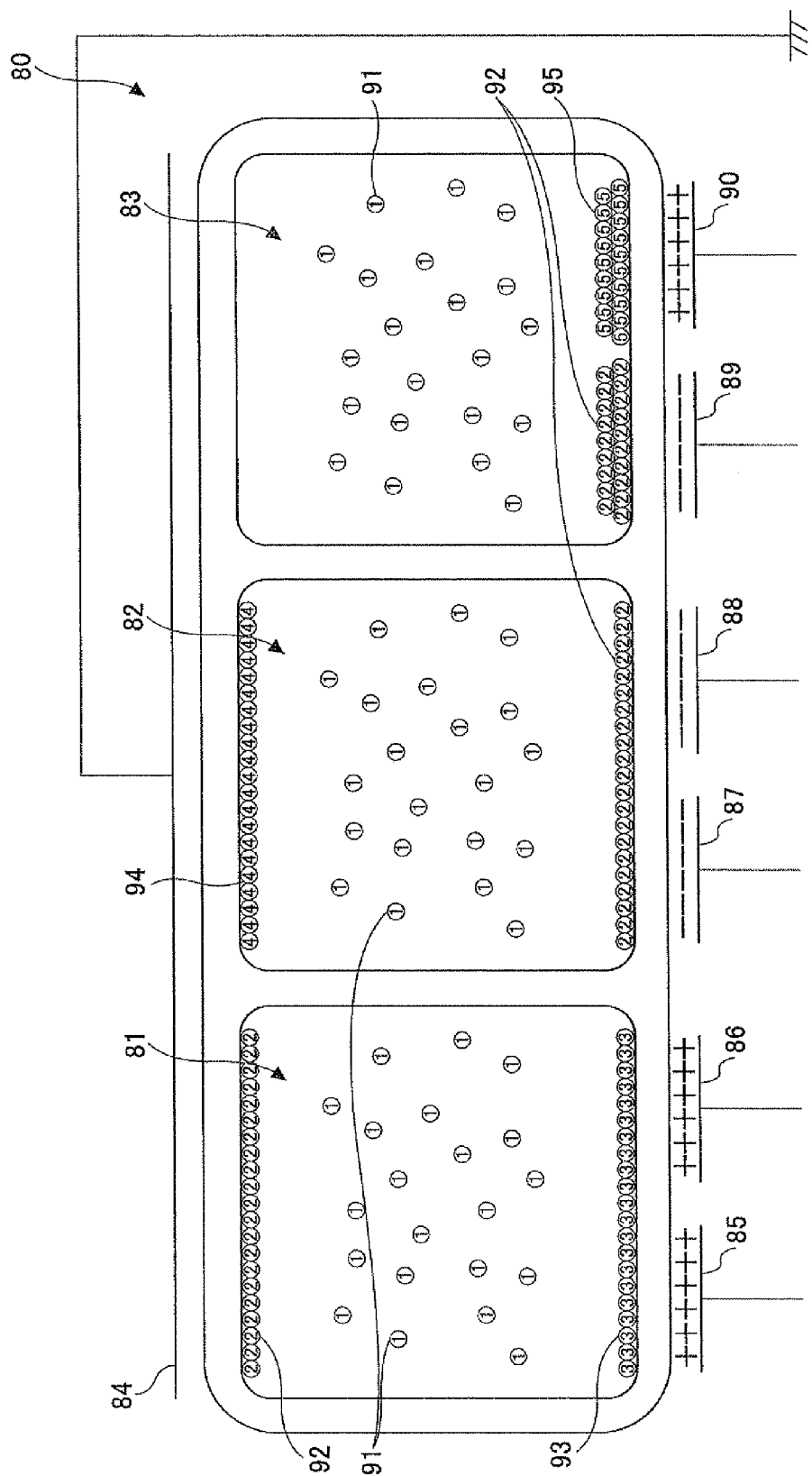
FIG. 6 is a cross-sectional view showing the configuration of the display device in comparative example 5.

Furthermore, the display device in comparative example 5 has the configuration of the invention A (shown in FIG. 4 of JP-A-2009-9092), and the configuration of the display device is as follows. In other words, as shown in FIG. 6, the three unit devices are arranged in which a first transparent electrode and second and third transparent electrodes are arranged so as to face each other via an electrophoretic display medium. In the unit devices, the surface on which the first electrode is arranged serves as the display surface of the electrophoretic display device, and the second and third electrodes are arranged on the side almost opposite to the display surface. In this case, the three devices 81, 82, and 83 contain the white particles 91 and the black particles 92 and contain the yellow particles 93, the magenta particles 94, and the cyan particles 95, respectively, as third dispersion particles. The devices 81, 82, and 83 share the first electrode 84, and the second electrodes 85, 87, and 89 and the third electrodes 86, 88, and 90 are each controlled with respect to the first electrode 84.

Figure 7:
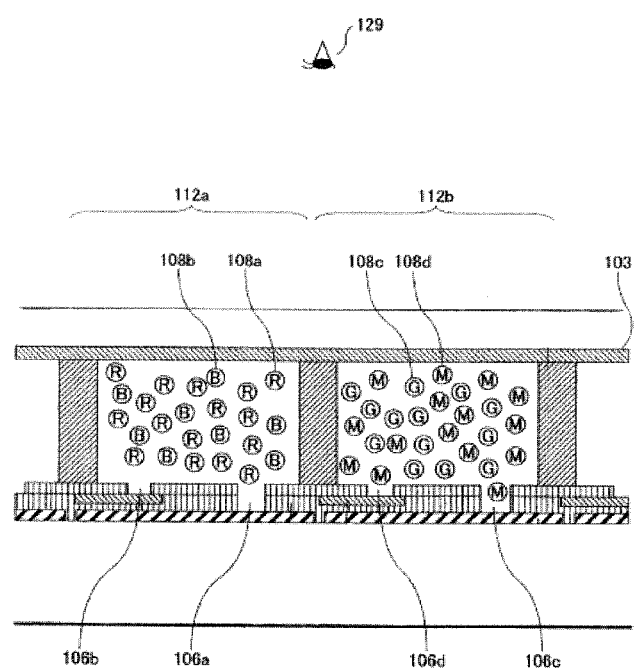
FIG. 7 is a cross-sectional view showing the configuration of the display device in comparative example 6.

Furthermore, the display device in comparative example 6 is the one shown in FIG. 13 of Patent Document 3, and the configuration of the display device is as follows. In other words, as shown in FIG. 7, the display device includes the two unit cells (sub-pixels 112a and 112b) in which is filled the electrophoretic ink obtained by dispersing the two types of the particles having the different charging properties and the different colors in the translucent solvent. Here, in the sub-pixel 112a, the positively-charged red (R) particles 108a and the negatively-charged blue (B) particles 108b are contained. Furthermore, in the sub-pixel 112b, the positively-charged green (G) charge particles 108c and the negatively-charged magenta (M) 108d particles are contained. Furthermore, the transparent common electrode 103 is arranged on the viewing side, and the laminated upper and lower individual electrodes are arranged on the side opposite to the viewing side. In addition, the first opening parts 106a and 106c and the second opening parts 106b and 106d each having no electrode are provided on the side opposite to the viewing side.

Figure 8:
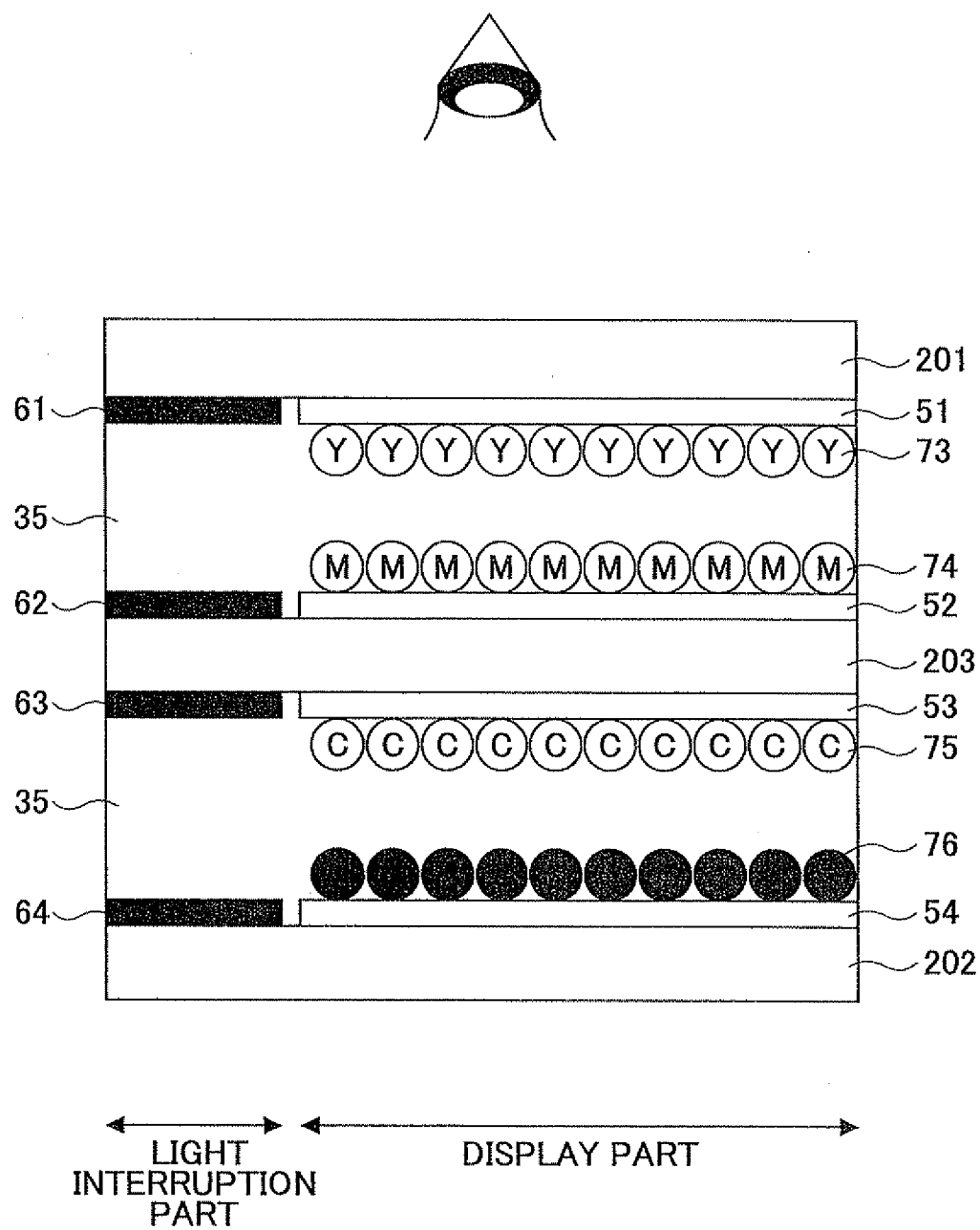
FIG. 8 is a cross-sectional view showing the configuration of the display device in comparative example 7.

Furthermore, the display device in comparative example 7 is the one shown in FIG. 8 of Patent Document 4, and the configuration of the display device is as follows. In other words, as shown in FIG. 8, the display device is laminated with two unit cells. In this laminated structure, an observed-surface substrate is specified as a substrate 201, an intermediate substrate is specified as a first substrate 203, and a rear-surface substrate is specified as a substrate 202. Furthermore, display electrodes are specified as a first display electrode 51, a second display electrode 52, a third display electrode 53, and a fourth display electrode 54 in that order from the side of the observed-surface to the side of the rear surface. Moreover, collect electrodes are specified as a first collect electrode 61, a second collect electrode 62, a third collect electrode 63, and a fourth collect electrode 64 in the same manner.

The first display electrode 51, the second display electrode 52, the third display electrode 53, and the fourth display electrode 54 are arranged so as to be substantially overlapped with each other as viewed from an observer. Furthermore, in a upper column cell, positively-charged yellow particles 73 serving as first colored electrophoretic particles and negatively-charged magenta particles 74 serving as second colored electrophoretic particles are filled in an insulating liquid 35 in a dispersed state. Moreover, in a lower cell, the negatively-charged cyan particles 75 serving as third particles and the negatively-charged black particles 76 serving as fourth particles are filled in the insulating liquid 35 in a dispersed state.

Referring to table 1, comparative examples and the present invention are compared with each other.

First, since the configurations of comparative examples 1 and 2 cannot display a black color, it is found that comparative examples 1 and 2 obtain a lesser black and white contrast compared with the present invention. Furthermore, since the configuration of comparative example 3 has the hues of only yellow, cyan, and magenta colors or the hue of only a white color, comparative example 3 obtains a further lesser black and white contrast compared with the present invention. In addition, the color densities of red, green, and blue colors obtained by comparative example 3 are lower than those obtained by the present invention.

Next, since the configuration of comparative example 4 does not have a hue capable of expressing a white color, it is found that comparative example 4 has smaller white reflectivity compared with the present invention and cannot express a bright white color. In addition, red, green, and blue colors expressed by comparative example 4 become very dark.

Furthermore, the configuration of comparative example 5 can realize high white-color reflectivity and a high black and white contrast similar to the present invention. However, since the configuration of the comparative example 5 can express only the hue of a yellow color, a magenta color, or a cyan color in each individual cell, the color densities of red, green, and blue colors obtained by comparative example 5 are lower than those obtained by the present invention.

Furthermore, since the configuration of comparative example 6 can express the four basic hues using two types of white and black colors in one cell similar to the present invention, a hue range capable of being expressed by comparative example 6 is the same as that capable of being expressed by the present invention. However, in the configuration of comparative example 6, the individual electrodes are vertically laminated with each other. In addition, the two opening parts are provided in the vicinity of the individual electrodes. As a result, the configuration of comparative example 6 becomes so complicated. For this reason, when it is assumed that the display device is driven by TFTs, the structure of the TFTs becomes so complicated, which in turn increases the manufacturing costs.

Finally, comparative example 7 can express ideal hues by the subtractive color mixing principle using a laminated structure. Accordingly, a hue range capable of being expressed by comparative example 7 is broader than that capable of being expressed by the present invention. However, since the configuration of comparative example 7 requires the laminated structure of the display electrodes, it has specific disadvantages in practical use, such as (1) increased manufacturing costs due to a complicated device configuration, (2) interruption of light occurring when the TFTs are not transparent because the TFTs are required for each layer so as to drive the display device by the TFTs, and (3) a complicated display method because the transparent electrode on the viewing side is divided.

Next, the electrophoretic liquid and the display device according to another embodiment of the present invention are described.

The electrophoretic liquid (referred to as a second electrophoretic liquid) according to this embodiment of the present invention includes first particles that have the property of scattering light over an entire visible range and positively or negatively charged; second particles that have the property of absorbing light of a specific wavelength range in the visible range and are charged to a polarity opposite to that of the first particles; third particles that have the property of scattering light over the entire visible range and are charged to a polarity the same as that of the second particles; and a dispersion medium that has the property of allowing the light of the specific wavelength range absorbed by the second particles to pass through and absorbing light of ranges other than the specific wavelength range.

In the electrophoretic liquid, the first particles, the second particles, and the third particles are dispersed in the dispersion medium.

Furthermore, the display device according to this embodiment includes plural cells that are arranged on a supporting body or arranged in the supporting body and encapsulate the electrophoretic liquid described above; and opposing electrodes to which a voltage or a current is applied so that the first particles, the second particles, and the third particles are moved in the cells.

Figure 9:
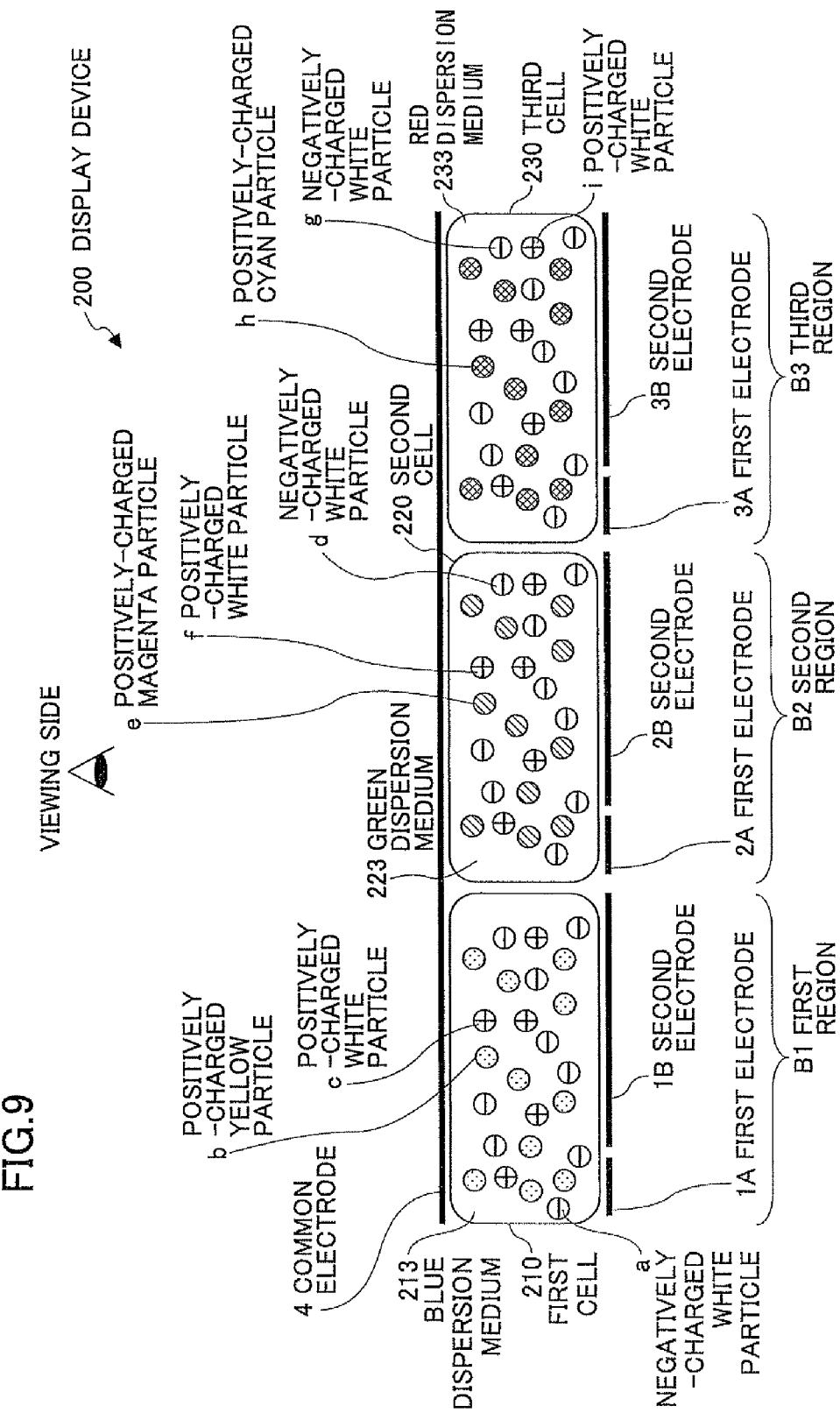
FIG. 9 is a cross-sectional view showing a second configuration of the display device according to another embodiment of the present invention.

A configuration example (second configuration example) according to the embodiment of the present invention is shown in FIG. 9. FIG. 9 is a cross-sectional view showing a second configuration of the display device according to the embodiment of the present invention.

The display device 200 is composed of three display regions (a first region B1, a second region B2, and a third region B3) having different expressible hue ranges.

The first region B1 has a first cell 210 encapsulating a-particles as first particles that have the property of scattering light over an entire visible range and are positively or negatively charged; b-particles as second particles that have the property of absorbing light of a first specific wavelength range in the visible range and are charged to a polarity opposite to that of the a-particles; c-particles as third particles that have the property of scattering light over the entire visible range and are charged to a polarity the same as that of the b-particles; and a dispersion medium 213 that has the property of allowing the light of the first specific wavelength range absorbed by the b-particles to pass through and absorbing other light.

The second region B2 has a second cell 220 encapsulating d-particles as first particles that have the property of scattering light over an entire visible range and are positively or negatively charged; e-particles as second particles that have the property of absorbing light of a second specific wavelength range in the visible range and are charged to a polarity opposite to that of the d-particles; f-particles as third particles that have the property of scattering light over the entire visible range and are charged to a polarity the same as that of the e-particles; and a dispersion medium 223 that has the property of allowing the light of the second specific wavelength range absorbed by the e-particles to pass through and absorbing other light.

The third region B3 has a third cell 230 encapsulating g-particles as first particles that have the property of scattering light over an entire visible range and are positively or negatively charged; h-particles as second particles that have the property of absorbing light of a third specific wavelength range in the visible range and are charged to a polarity opposite to that of the g-particles; i-particles as third particles that have the property of scattering light over the entire visible range and are charged to a polarity the same as that of the h-particles; and a dispersion medium 233 that has the property of allowing the light of the third specific wavelength range absorbed by the h-particles to pass through and absorbing other light.

In the configuration example in FIG. 9, the particles a, d, and g are the negatively-charged white particles a, d, and g as the first particles. Furthermore, as the second particles, the particles b are the positively-charged yellow particles b, the particles e are the positively-charged magenta particles e, and the particles h are the positively-charged cyan particles h. Furthermore, the particles c, f, and i are the positively-charged white particles c, f, and i as the third particles. The first region B1 encapsulates the dispersion medium (blue dispersion medium 213) that has the property of allowing blue light to pass through and absorbing light other than the blue light. The second region B2 encapsulates the dispersion medium (green dispersion medium 223) that has the property of allowing green light to pass through and absorbing light other than the green light. The third region B3 encapsulates the dispersion medium (red dispersion medium 233) that has the property of allowing red light to pass through and absorbing light other than the red light.

Note that in the configuration example in FIG. 9, the first region B1 (the first cell 210) uses the combination of the negatively-charged white particles a, the positively-charged white particles c, the positively-charged yellow particles b, and the blue dispersion medium 213. Furthermore, the second region B2 (the second cell 220) uses the combination of the negatively-charged white particles d, the positively-charged white particles f, the positively-charged magenta particles e, and the green dispersion medium 223.

Furthermore, the third region B3 (the third cell 230) uses the combination of the negatively-charged white particles g, the positively-charged white particles i, the positively-charged cyan particles h, and the red dispersion medium 233.

Furthermore, based on the principle of displaying hues shown in FIGS. 10A through 10D described below, the same effects as those obtained when the configuration in FIG. 9 is used are obtained even if the first region B1 (the first cell 210) uses the combination of the negatively and positively charged white particles, the negatively and positively charged blue particles, and the yellow dispersion medium; the second region B2 (the second cell 220) uses the combination of the negatively and positively charged white particles, the negatively and positively charged green particles, and the magenta dispersion medium; and the third region B3 (the third cell 230) uses the combination of the negatively and positively charged white particles, the negatively and positively charged red particles, and the cyan dispersion medium instead of using the hues in the configuration example in FIG. 9.

Note that the white particles as the first particles used in this configuration example may be the same as those used in the first configuration example described above. Furthermore, the white particles as the third particles may be the same as those used in the first configuration example except that their polarities are different. Furthermore, the second particles as the colored particles (in yellow, magenta, and red) may be the same as those used in the first configuration example. Furthermore, the dispersion medium used in this configuration example may be the same as those used in the first configuration example.

Furthermore, each of the first cell 210, the second cell 220, and the third cell 230 is partitioned by the partition walls to form a prescribed space, and the shapes of the cells 210, 220, and 230 conceptually include a capsule and are the same as those of the first cell 10, the second cell 20, and the third cell 30 in the first configuration example.

In this case, at the main surface of the supporting body on the side facing the cells 210, 220, and 230 (that is, on the viewing side of the three regions B1, B2, and B3), the transparent common electrode 4 common to the first cell 210, the second cell 220, and the third cell 230 is provided. Furthermore, on the side opposite to the common electrode 4 (the viewing side) via the cells 210, 220, and 230, an individual electrode composed of a first electrode having a small surface area and a second electrode having a large surface area is provided so as to correspond to each of the spaces partitioned as the cells 210, 220, and 230. In FIG. 9, the first region B1 (the first cell 210) includes a first electrode 1A having a small surface area and a second electrode 1B having a large surface area, the second region B2 (the second cell 220) includes a first electrode 2A having a small surface area and a second electrode 2B having a large surface area, and the third region B3 (the third cell 230) includes a first electrode 3A having a small surface area and a second electrode 3B having a large surface area.

In this configuration, the display device 200 can create four basic states depending on the electrode potentials of the first electrode and the second electrode in each of the regions B1, B2, and B3 (the cells 210, 220, and 230). The four states are described below with reference to FIGS. 10A through 10D.

FIGS. 10A through 10D show the hues that can be displayed in the first region B1 (the first cell 210) shown in FIG. 9.

Figure 10A:
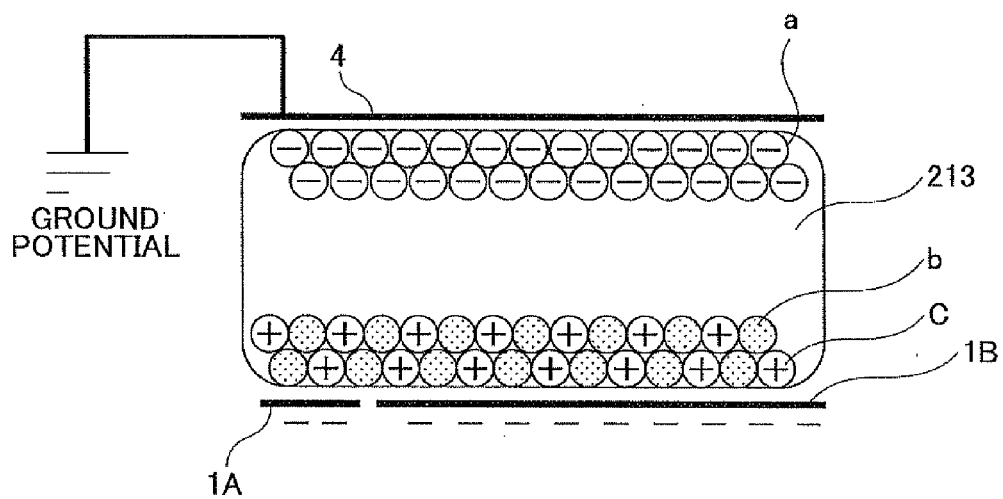
FIGS. 10A through 10D are diagrams showing a second operation state of the display device in FIG. 9.

(a) First State (FIG. 10A)

First, FIG. 10A shows a case in which the potential of the common electrode 4 is maintained at a ground potential and those of the first and second electrodes 1A and 1B are both maintained at a negative potential. Since the negatively-charged white particles a have a negative charge, they are repulsed from the first and second electrodes 1A and 1B and move to the vicinity of the common electrode 4. On the other hand, since the positively-charged yellow particles b and the positively-charged white particles c have a positive charge, they are attracted to the first and second electrodes 1A and 1B. As a result, the first region B1 appears white on the viewing side (on the side of the common electrode 4).

Figure 10B:
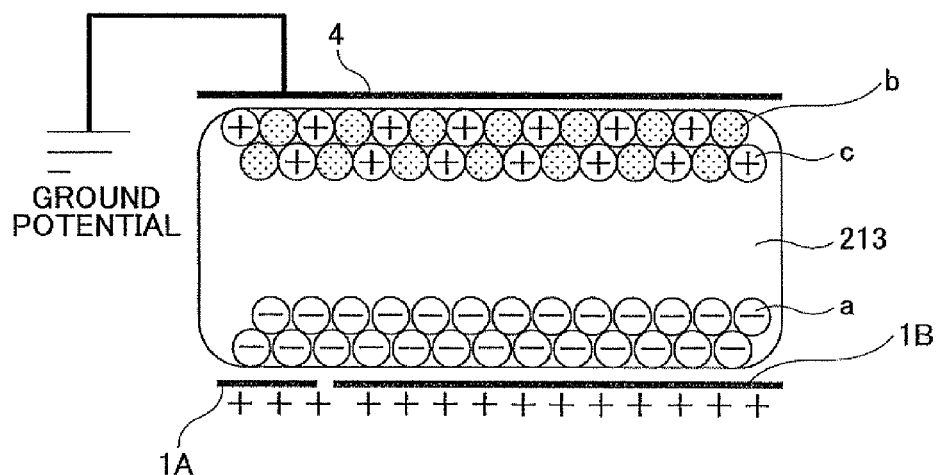

(b) Second State (FIG. 10B)

Next, FIG. 10B shows a case in which the potential of the common electrode 4 is maintained at a ground potential and those of the first and second electrodes 1A and 1B are both maintained at a positive potential. Since the negatively-charged white particles a have a negative charge, they are attracted to the first and second electrodes 1A and 1B. On the other hand, the positively-charged yellow particles b and the positively-charged white particles c have a positive charge, they are repulsed from the first and second electrodes 1A and 1B and move to the vicinity of the common electrode 4. As a result, the first region B1 appears yellow on the viewing side (on the side of the common electrode 4). In this case, since the reflection of the positively-charged yellow particles b is compensated by the positively-charged white particles c, the color purity of a display color is improved compared with the case of the first configuration example (the case shown in FIG. 2A).

Figure 10C:
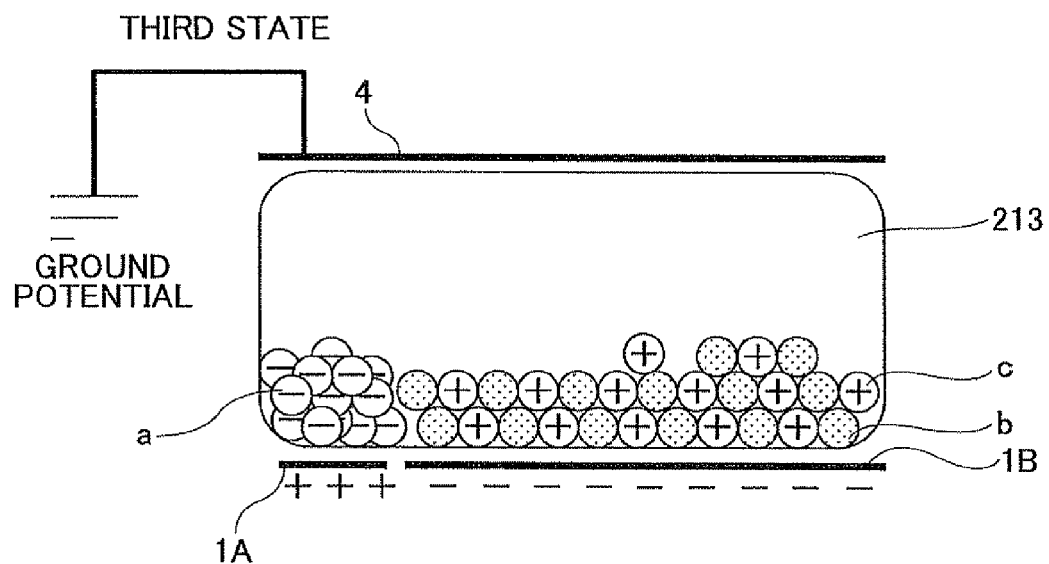

(c) Third State (FIG. 10C)

Furthermore, FIG. 10C shows a case in which the potential of the common electrode 4 is maintained at a ground potential, that of the first electrode 1A is maintained at a positive potential, and that of the second electrode 1B is maintained at a negative potential. Since the negatively-charged white particles a have a negative charge, they move to the vicinity of the first electrode 1A. Furthermore, since the positively-charged yellow particles b and the positively-charged white particles c have a positive charge, they move to the vicinity of the second electrode 1B. That is, the negatively-charged white particles a, the positively-charged yellow particles b, and the positively-charged white particles c are positioned on the side opposite to the viewing side. Accordingly, the light incident from the viewing side is absorbed by the blue dispersion medium 213 and then applied to the negatively-charged white particles a, the positively-charged yellow particles b, and the positively-charged white particles c. Since the negatively-charged white particles a scatter light of any wavelength, they scatter blue light as light of a wavelength other than the light of the wavelength absorbed by the blue dispersion medium 13. Therefore, the negatively-charged white particles a appear blue on the viewing side. Since the positively-charged yellow particles b have the property of absorbing blue light, they do not scatter light. Therefore, the positively-charged yellow particles b appear black on the viewing side. Here, since the surface area of the second electrode 1B is relatively larger than that of the first electrode 1A, the color originating from the positively-charged yellow particles b becomes dominant. Therefore, the first region B1 appears almost black on the viewing side (on the side of the common electrode 4) as a whole. Note that the positively-charged white particles c existing together with the positively-charged yellow particles b appear blue on the viewing side, but they do not cancel the black color by the positively-charged yellow particles b.

Figure 10D:
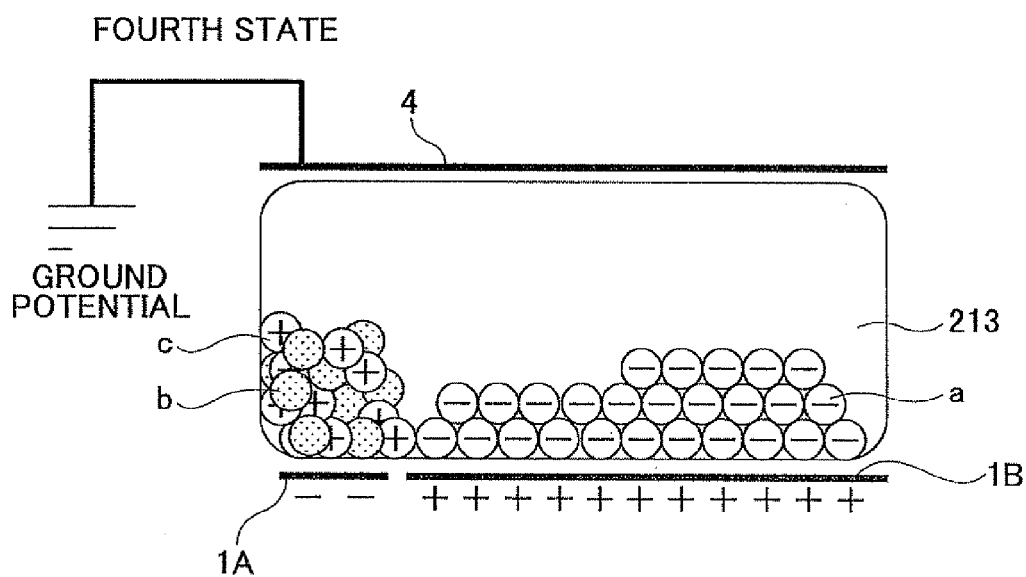

(d) Fourth State (FIG. 10D)

Furthermore, FIG. 10D shows a case in which the potential of the common electrode 4 is maintained at a ground potential, that of the first electrode 1A is maintained at a negative potential, and that of the second electrode 1B is maintained at a positive potential. Since the negatively-charged white particles a have a negative charge, they move to the vicinity of the second electrode 1B. Since the positively-charged yellow particles b and the positively-charged white particles c have a positive charge, they move to the vicinity of the first electrode 1A. That is, the negatively-charged white particles a, the positively-charged yellow particles b, and the positively-charged white particles c are positioned on the side opposite to the viewing side. Accordingly, the light incident from the viewing side is absorbed by the blue dispersion medium 13 and then applied to the negatively-charged white particles a, the positively-charged yellow particles b, and the positively-charged white particles c. As described above, the negatively-charged white particles a appear blue on the viewing side, and the positively-charged yellow particles b appear black on the viewing side. Here, since the surface area of the second electrode 1B is relatively larger than that of the first electrode 1A, the color originating from the negatively-charged white particles a becomes dominant. Therefore, the first region B1 appears almost blue on the viewing side (on the side of the common electrode 4) as a whole. Note that since the positively-charged white particles c existing together with the positively-charged yellow particles b appear blue on the viewing side and have the same hue as a blue color by the negatively-charged white particles a, they have the same action as the negatively-charged white particles a.

As described above, in the first region B1 (the first cell 210), the potentials of the first and second electrodes 1A and 1B are varied with the potential of the common electrode 4 maintained at a ground potential, whereby the four basic hues of white, yellow, black, and blue colors can be expressed. Furthermore, based on the same principle, in the second region B2 (the second cell 220), the potentials of the first and second electrodes 1A and 1B are varied with the potential of the common electrode 4 maintained at a ground potential, whereby the four basic hues of white, magenta, black, and green colors can be expressed. Furthermore, in the third region B3 (the third cell 230), the potentials of the first and second electrodes 1A and 1B are varied with the potential of the common electrode 4 maintained at a ground potential, whereby the four basic hues of white, cyan, black, and red colors can be expressed. Furthermore, the third particles (positively-charged white particles) improve the color purity of the hues expressed by the second particles than those expressed by the second particles in the first configuration example in any region (cell) but do not adversely affect other hues.

Furthermore, it is also possible to use hues displayed as intermediate states of transitions between the four states of the first through fourth states.

Note that a ratio of the area of the first electrode 1A having the small surface area to that of the second electrode 1B having the large surface area is desirably 1:2 or greater, and more desirably 1:5 or greater. The greater the area ratio is, the higher a black and white contrast becomes.

In the related art, only two or three hues can be basically expressed in one region with the above configuration. Therefore, when three cells having different expressible hues are arranged side by side, an expressible hue range is limited. However, according to the embodiment of the present invention, with the configuration in which the three types of the particles having the different charge polarities are encapsulated in one cell, the four colors of the hues can be basically expressed in one region. Therefore, it is possible to substantially expand an expressible hue range when the three cells having the different expressible hues are arranged side by side. Furthermore, since the black and white hues are expressed in all the first through third regions B1 through B3 in the four colors of the hues, a black text can be expressed in a white background. Moreover, since each of the regions has the two hues in addition to the white and black colors, the embodiment of the present invention can remarkably expand a color reproduction range compared with the related art disclosed in JP-A-20099092 in which only one hue can be expressed in one region in addition to the white and black colors (the invention A: a display device using an electrophoretic liquid in which three types of dispersion particles having different optical properties and charging properties are dispersed in a solvent. In the electrophoretic liquid, the first dispersion particles have no charge, the second dispersion particles are positively-charged electrophoretic particles, and the third dispersion particles are negatively-charged electrophoretic particles).

EXAMPLES

Production of Positively-Charged White Electrophoretic Particles

A mixed solvent consisting of 30 parts of ethanol and 3 parts of water was poured into a reaction container having a stirrer, and then ammonium chloride was added to the mixed solvent so as to have a pH of 9.5. Next, 4 parts of 3-(trimethoxysilyl)propylamine were added to the mixture and dissolved. Then, 2.5 parts of titanium oxide were added to the mixture and stirred for 10 minutes. Moreover, 180 parts of ethanol were further added to the mixture and stirred. After that, a solid content was collected from the mixture by centrifugal separation and left for a whole day and night. Subsequently, the solid content was vacuum-dried at 70° C. for 4 hours to obtain surface-treated titanium oxide.

2.5 parts of toluene were poured into a reaction container having a stirrer, a thermometer, and a reflux condenser. Then, 3 parts of 2-ethylhexyl methacrylate were added to the 2.5 parts of toluene and dissolved. Next, 0.01 parts of toluene, in which 2.5 parts of the surface-treated titanium oxide and 0.03 parts of azobisisobutyronitrile were dissolved, was added to the mixture, and the mixture was heated and stirred at 70° C. for 7 hours under a nitrogen atmosphere. Moreover, the solid content was cleaned with tetrahydrofuran by repetitive centrifugal separations and vacuum-dried at 70° C. for 4 hours to obtain white electrophoretic particles having an average particle diameter of 400 nm.

The white electrophoretic particles showed excellent dispersibility in "Isopar G, H, L" (produced by Exxon Mobil Corporation) to which a surfactant of "Solsperse 17000" (Avecia Ltd) was added. When an electric field of 2 kV/cm was applied between opposing electrodes, the white electrophoretic particles showed the behavior of positively-charged electrophoretic particles.

(Production of Negatively-Charged White Electrophoretic Particles)

A mixed solvent consisting of 93 parts of ethanol and 7 parts of water was poured into a reaction container having a stirrer, and then glacial acetic acid was added to the mixed solvent so as to have a pH of 4.5. Next, 16 parts of 3-(trimethoxysilyl)propylamine methacrylate were added to the mixture and dissolved. Then, 100 parts of titanium oxide were added to the mixture and stirred for 10 minutes. Moreover, 180 parts of ethanol were further added to the mixture and stirred. After that, a solid content was collected from the mixture by centrifugal separation and left for a whole day and night. Subsequently, the solid content was vacuum-dried at 70° C. for 4 hours to obtain surface-treated titanium oxide.

70 parts of toluene were poured into a reaction container having a stirrer, a thermometer, and a reflux condenser. Then, 50 parts of lauryl methacrylate were added to the 70 parts of toluene and dissolved. Next, 25 parts of toluene, in which 40 parts of the surface-treated titanium oxide and 0.3 parts of azobisisobutyronitrile were dissolved, was added to the mixture, and the mixture was heated and stirred at 70° C. for 7 hours under a nitrogen atmosphere. Moreover, the solid content was cleaned with the toluene by repetitive centrifugal separations and vacuum-dried at 70° C. for 4 hours to obtain white electrophoretic particles having an average particle diameter of 400 nm.

The white electrophoretic particles showed excellent dispersibility in "Isopar G, H L" (produced by Exxon Mobil Corporation) to which a surfactant of "Solsperse 17000" (Avecia Ltd) was added. When an electric field of 2 kV/cm was applied between opposing electrodes, the white electrophoretic particles showed the behavior of negatively-charged electrophoretic particles.

(Production of Positively-Charged Yellow Electrophoretic particles)

100 parts of water, 4 parts of monoazo pigment (PY-74), 0.1 parts of 37 mass % hydrochloric acid, and 0.1 parts of 4-vinyl aniline were poured into a reaction container having a stirrer, a thermometer, and a reflux condenser, and then they were stirred. Next, a liquid obtained by dissolving 0.05 parts of sodium nitrite into 0.35 parts of water was caused to drip in the mixture for about 1 hour. Moreover, the mixture was raised to 65° C. and stirred for 3 hours, and then it was cooled to room temperature and stirred for a whole day and night. Next, a solid content was collected from the mixture by centrifugal separation and dispersed in water. Moreover, the solid content is further collected by centrifugal separation and left for a whole day and night. After that, the solid content was vacuum-dried at 40° C. for 4 hours to obtain surface-treated carbon black.

50 parts of surface-treated monoazo pigment, 100 parts of toluene, 100 parts of 2-ethylhexyl methacrylate, and 0.65 parts of azobisisobutyronitrile were poured into a reaction container having a stirrer, a thermometer, and a reflux condenser, and then they were stirred. Next, the mixture was heated and stirred at 70° C. for 7 hours under a nitrogen atmosphere and then cooled to room temperature. Moreover, 500 parts of tetrahydrofuran were added to the mixture, and then the mixture was stirred. Subsequently, 3000 parts of methanol were further added to the mixture to generate a precipitation. After that, the mixture was suction-filtered to collect a solid content. Then, the solid content was cleaned with tetrahydrofuran by repetitive centrifugal separations and vacuum-dried at 70° C. for 4 hours to obtain yellow electrophoretic particles having an average particle diameter of 400 nm.

The yellow electrophoretic particles showed excellent dispersibility in "Isopar G, H, L" (produced by Exxon Mobil Corporation) to which "Solsperse 17000" (Avecia Ltd) was added. When an electric field of 2 kV/cm was applied between opposing electrodes, the yellow electrophoretic particles showed the behavior of positively-charged electrophoretic particles.

(Production of Positively-Charged Magenta Electrophoretic Particles)

100 parts of water, 4 parts of quinacridone pigment (PR-122), 0.1 parts of 37 mass % hydrochloric acid, and 0.1 parts of 4-vinyl aniline were poured into a reaction container having a stirrer, a thermometer, and a reflux condenser, and then they were stirred. Next, a liquid obtained by dissolving 0.05 parts of sodium nitrite into 0.35 parts of water was caused to drip in the mixture for about 1 hour. Moreover, the mixture was raised to 65° C. and stirred for 3 hours, and then it was cooled to room temperature and stirred for a whole day and night. Next, a solid content was collected from the mixture by centrifugal separation and dispersed in water. Subsequently, the solid content was further collected by centrifugal separation and left for a whole day and night. After that, the solid content was vacuum-dried at 40° C. for 4 hours to obtain surface-treated carbon black.

50 parts of surface-treated quinacridone pigment, 100 parts of toluene, 100 parts of 2-ethylhexyl methacrylate, and 0.65 parts of azobisisobutyronitrile were poured into a reaction container having a stirrer, a thermometer, and a reflux condenser, and then they were stirred. Next, the mixture was heated and stirred at 70° C. for 7 hours and then cooled to room temperature. Moreover, 500 parts of tetrahydrofuran were added to the mixture, and then the mixture was stirred. Subsequently, 3000 parts of methanol were further added to the mixture to generate a precipitation. After that, the mixture was suction-filtered to collect a solid content. Then, the solid content was cleaned with tetrahydrofuran by repetitive centrifugal separations and vacuum-dried at 70° C. for 4 hours to obtain magenta electrophoretic particles having an average particle diameter of 300 nm.

The magenta electrophoretic particles showed excellent dispersibility in "Isopar G, H L" (produced by Exxon Mobil Corporation) to which "Solsperse 17000" (Avecia Ltd) was added. When an electric field of 2 kV/cm was applied between opposing electrodes, the magenta electrophoretic particles showed the behavior of positively-charged electrophoretic particles.

(Production of Positively-Charged Cyan Electrophoretic Particles)

100 parts of water, 4 parts of phthalocyanine pigment (FG-7351), 0.1 parts of 37 mass % hydrochloric acid, and 0.1 parts of 4-vinyl aniline were poured into a reaction container having a stirrer, a thermometer, and a reflux condenser, and then they were stirred. Next, a liquid obtained by dissolving 0.05 parts of sodium nitrite into 0.35 parts of water was caused to drip in the mixture for about 1 hour. Moreover, the mixture was raised to 65° C. and stirred for 3 hours, and then it was cooled to room temperature and stirred for a whole day and night. Next, a solid content was collected from the mixture by centrifugal separation and dispersed in water. Subsequently, the solid content was further collected by centrifugal separation and left for a whole day and night. After that, the solid content was vacuum-dried at 40° C. for 4 hours to obtain surface-treated carbon black.

50 parts of surface-treated phthalocyanine pigment, 100 parts of toluene, 100 parts of 2-ethylhexyl methacrylate, 0.65 parts of azobisisobutyronitrile were poured into a reaction container having a stirrer, a thermometer, and a reflux condenser, and then they were stirred. Next, the mixture was heated and stirred at 70° C. for 7 hours and then cooled to room temperature. Moreover, 500 parts of tetrahydrofuran were added to the mixture, and then the mixture was stirred. Subsequently, 3000 parts of methanol were further added to the mixture to generate a precipitation. After that, the mixture was suction-filtered to collect a solid content. Then, the solid content was cleaned with tetrahydrofuran by repetitive centrifugal separations and vacuum-dried at 70° C. for 4 hours to obtain cyan electrophoretic particles having an average particle diameter of 400 nm.

The cyan electrophoretic particles showed excellent dispersibility in "Isopar G, H L" (produced by Exxon Mobil Corporation) to which "Solsperse 17000" (Avecia Ltd) was added. When an electric field of 2 kV/cm was applied between opposing electrodes, the cyan electrophoretic particles showed the behavior of positively-charged electrophoretic particles.

Example 1

Production of the Electrophoretic Liquid 1 Used in the First Region A1 (the First Cell 10)

The positively-charged yellow particles and the negatively-charged white particles produced in the above manner were dispersed in the blue dispersion medium 13 as isoparaffinic hydrocarbon (whose product name was "Isopar G" produced by Exxon Mobil corporation) colored in blue obtained by dissolving "Oil Blue N" produced by Sigma-Aldrich Corporation. Note that in the dispersion liquid, the proportion of the positively-charged yellow particles was 5% by weight, the proportion of the negatively-charged white particles was 30% by weight, and "Solsperse 17000" was added as a surfactant.

Example 2

Production of the Electrophoretic Liquid 2 Used in the Second Region A2 (the Second Cell 20)

The positively-charged magenta particles and the negatively-charged white particles produced in the above manner were dispersed in the green dispersion medium 23 as "Isopar G" colored in green obtained by dissolving "Solvent Green 3" produced by Sigma-Aldrich Corporation. Note that in the dispersion liquid, the proportion of the positively-charged magenta particles was 5% by weight, the proportion of the negatively-charged white particles was 30% by weight, and "Solsperse 17000" was added as a surfactant.

Example 3

Production of the Electrophoretic Liquid 3 Used in the Third Region A3 (the Third Cell 30)

The positively-charged cyan particles and the negatively-charged white particles produced in the above manner were dispersed in the red dispersion medium 33 as "Isopar G" colored in red obtained by dissolving "Sudan Red 7B" and "Oil Red 5B" produced by Sigma-Aldrich Corporation. Note that in the dispersion liquid, the proportion of the positively-charged cyan particles was 5% by weight, the proportion of the negatively-charged white particles was 30% by weight, and "Solsperse 17000" was added as a surfactant.

Example 4

Production of the Electrophoretic Liquid 4 Used in the First Region B1 (the First Cell 210)

The positively-charged yellow particles, the negatively-charged white particles, and the positively-charged white particles produced in the above manner were dispersed in the blue dispersion medium 13 as "Isopar G" colored in blue obtained by dissolving "Oil Blue N" produced by Sigma-Aldrich Corporation. Note that in the dispersion liquid, the proportion of the positively-charged yellow particles was 5% by weight, the proportion of the negatively-charged white particles was 30% by weight, the proportion of the positively-charged white particles was 5% by weight, and "Solsperse 17000" was added as a surfactant.

Example 5

Production of the Electrophoretic Liquid 5 Used in the Second Region B2 (the Second Cell 220)

The positively-charged magenta particles, the negatively-charged white particles, and the positively-charged white particles produced in the above manner were dispersed in the green dispersion medium 23 as "Isopar G" colored in green obtained by dissolving "Solvent Green 3" produced by Sigma-Aldrich Corporation. Note that in the dispersion liquid, the proportion of the positively-charged magenta particles was 5% by weight, the proportion of the negatively-charged white particles was 30% by weight, the proportion of the positively-charged white particles was 5% by weight, and "Solsperse 17000" was added as a surfactant.

Example 6

Production of the Electrophoretic Liquid 6 Used in the Third Region B3 (the Third Cell 230)

The positively-charged cyan particles, the negatively-charged white particles, and the positively-charged white particles produced in the above manner were dispersed in the red dispersion medium 33 as "Isopar G" colored in red obtained by dissolving "Sudan Red 7B" and "Oil Red 5B" produced by Sigma-Aldrich Corporation. Note that in the dispersion liquid, the proportion of the positively-charged cyan particles was 5% by weight, the proportion of the negatively-charged white particles was 30% by weight, the proportion of the positively-charged white particles was 5% by weight, and "Solsperse 17000" was added as a surfactant.

Example 7

Production of the Multi-Color-Display Electrophoretic Particles 100

On a PET film, the first electrodes 1A, 2A, and 3A having a small surface area and the second electrodes 1B, 2B, and 3B having a large surface area were formed. The widths of the first electrodes 1A, 2A, and 3A were set to 10 µm, the widths of the second electrodes 1B, 2B, and 3B were set to 90 µm, and the distances between the first and second electrodes (the distance between the first and second electrodes 1A and 1B, the distance between the first and second electrodes 2A and 2B, and the distance between the first and second electrodes 3A and 3B) were set to 10 µm. The first and second electrodes were arranged in 30 rows at a pitch of 120 µm.

Next, a urethane resin was coated on the electrodes with a thickness of 5 µm, and the cells 10, 20, and 30 made of a photoresist, in which the dispersion liquid was injected, were formed on the urethane resin. Using SU-8 (produced by Nippon Kayaku Micro, Co., Ltd.) used the photoresist, the partition walls of the cells were formed to have a thickness of 10 µm and a height of 50 µm. Furthermore, the cells were arranged at a pitch of 120 µm. As shown in FIG. 1, the first electrodes 1A, 2A, and 3A and the second electrodes 1B, 2B, and 3B were arranged so as to be positioned beneath the cells. In total, the 30 cells were formed on the first electrodes 1A, 2A, and 3A and the second electrodes 1B, 2B, and 3B.

The electrophoretic liquid 1 produced in example 1, the electrophoretic liquid 2 produced in example 2, and the electrophoretic liquid 3 produced in example 3 were sequentially filled in the 30 cells in the order starting from the leftmost one by a microdispenser. As for the remaining cells, the electrophoretic liquids 1, 2, and 3 were also sequentially filled in this order.

Next, in order to prevent the electrophoretic liquid from drying, a sealing film was formed on the liquid. The sealing film contained a gelatin resin incompatible with the electrophoretic liquids and a polyoxyethylene surfactant to reduce surface tension with the electrophoretic liquids. The gelatin resin heated to about 40° C. was coated on the electrophoretic liquids by a slit coater and dried to form the sealing film. Then, an adhesive was coated on the sealing film, and a PET film, on which the transparent conductive film ITO (the common electrode 4) was formed, was bonded to the sealing film to produce the multi-color-display electrophoretic display device 100.

Example 8

Production of the Multi-Color-Display Electrophoretic Display Device 200

Instead of the electrophoretic liquids 1 through 3, the electrophoretic liquid 4 produced in example 4, the electrophoretic liquid 5 produced in example 5, and the electrophoretic liquid 6 produced in example 6 were sequentially filled in the 30 cells in the order starting from the leftmost one by a microdispenser. As for the remaining cells, the electrophoretic liquids 4, 5, and 6 were sequentially filled in this order. Making the other condition the same as example 7, the multi-color-display electrophoretic display device 200 was produced.

When the respective colors were displayed by the display device according to this example, it was found that the color purity of the display colors displayed by the display device 200 became more improved than those of the display colors displayed by the display device 100 according to example 7.

As described above, the embodiments of the present invention can provide the following effects. That is, according to one aspect of the present invention, the electrophoretic liquid includes the first particles as the white electrophoretic particles, the second particles as the colored electrophoretic particles having the potential of the polarity opposite to that of the first particles, and the colored dispersion medium having the color complementary to the color of the second particles. With this configuration, it is possible to increase the number of the basic hues expressible by one type of electrophoretic liquid and expand the expressible color reproduction range.

Furthermore, according to another aspect of the present invention, the electrophoretic liquid includes the first particles as the white electrophoretic particles, the second particles as the colored electrophoretic particles whose potential has the polarity opposite to that of the first particles, the third particles as the white electrophoretic particles whose potential has the polarity the same as that of the second particles, and the colored dispersion medium having the color complementary to the color of the second particles. With this configuration, it is possible to increase the number of the basic hues expressible by one type of electrophoretic liquid and expand the expressible color reproduction range. Moreover, this electrophoretic liquid can improve the color purity of the colors of the second particles more than the above-described electrophoretic liquid does.

Furthermore, according to another aspect of the present invention, it is possible to realize the reflective display device having the expanded color reproduction range with the simple configuration in which the cell encapsulates the electrophoretic liquid.

Furthermore, according to another aspect of the present invention, the surface area of the first electrode is smaller than that of the second electrode. Therefore, when the particles are positioned on the side opposite to the viewing side, the hue on the viewing side is dominated by the hue originating from the hue of the particles on the second electrode. With this configuration, it is possible to improve the color purity.

According to another aspect of the present invention, the four basic hues are obtained. More specifically, the hue of a white color (having the property of scattering light over the entire visible range), the hue of the dispersion medium, the hue of the particles that absorb light of the specific wavelength range in the visible range and scatter light of ranges other than the specific wavelength range, and the hue of a black color (the hue of light absorbed by both the dispersion medium and the particles that absorb light of the specific wavelength range in the visible range and scatter light of ranges other than the specific wavelength range) are obtained. With this configuration, it is possible to realize the reflective display device having the expanded color reproduction range.

According to another aspect of the present invention, the three cells having the different hues are combined with each other. With this configuration, it is possible to provide the color reflective display device having the expanded color reproduction range.

According to another aspect of the present invention, the 12 basic hues are combined with each other. With this configuration, it is possible to provide the color reflective display device having the expanded color reproduction range.

According to another aspect of the present invention, the four basic hues are obtained. More specifically, the hue of a white color (the hue of the first particles (having the property of scattering light over the entire visible range)), the hue of the dispersion medium, the hue of light that is absorbed by the second particles and scattered by the third particles, the hue of a black color (the hue of light that is absorbed by both the dispersion medium and the second particles (as the particles that absorb light of the specific wavelength range in the visible range)) are obtained. With this configuration, it is possible to realize the reflective display device having the expanded color reproduction range.

According to another aspect of the present invention, the dispersion medium, which has the property of allowing light of the specific wavelength range to pass through, includes the dispersion medium liquid and the dye that allows the light of the specific wavelength range to pass through and absorbs light of ranges other than the specific wavelength range. Thus, it is possible to provide the colored dispersion medium with the simple material configuration. Furthermore, only two or three types of the particles exist in one cell. Thus, it is possible to make it easier to move the particles and increase a response speed.

According to another aspect of the present invention, the dispersion medium, which has the property of allowing light of the specific wavelength range to pass through, includes the dispersion medium liquid and the neutral or weakly-charged particles that allows the light of the specific wavelength range to pass through and absorbs light of ranges other than the specific wavelength range. With this configuration, when a white color is expressed, the colored dispersion medium may not enter the gaps between the white particles positioned on the common electrode as seen from the viewing side. Thus, it is possible to obtain the hue of a white color having a high color purity.

According to another aspect of the present invention, as the colored particles (the second particles) used in the three types of the cells, the yellow particles, the magenta particles, and cyan particles are used. Furthermore, as the hues of the dispersion medium used in the three types of the cells, the colors complementary of the colors of the respective particles are used. With this configuration, it is possible to provide the colored reflective display device having the expanded hue range.

According to another aspect of the present invention, as the colored particles used in the three types of the cells, the blue particles, the green particles, and the red particles are used. Furthermore, as the hues of the dispersion medium used in the three types of the cells, the colors complementary to the colors of the respective particles are used. With this configuration, it is possible to provide the color reflective display device having the expanded hue range.

The present invention is not limited to the specifically disclosed embodiments, and variations and modifications may be made without departing from the scope of the present invention.

The present application is based on Japanese Priority Applications No. 2008-211421 filed on Aug. 20, 2008, and No. 2009-065606 filed on Mar. 18, 2009, with the Japan Patent Office, the entire contents of which are hereby incorporated by reference.

The invention claimed is:
1. An electrophoretic liquid comprising:
first particles that have a property of scattering light over an entire visible range and are positively or negatively charged;
second particles that have a property of absorbing light of a specific wavelength range in the visible range and scattering light of ranges other than the specific wavelength range and are charged to a polarity opposite to a polarity of the first particles; and
a dispersion medium that has a property of allowing the light of the specific wavelength range absorbed by the second particles to pass through and absorbing the light of the ranges other than the specific wavelength range; wherein
the first particles and the second particles are dispersed in the dispersion medium.

2. A display device comprising:
plural cells that are arranged on a supporting body or arranged in the supporting body and encapsulate the electrophoretic liquid according to claim 1; and
opposing electrodes to which a voltage or a current is applied so that the first particles and the second particles are moved in the cells.

3. The display device according to claim 2, wherein
the opposing electrodes are composed of a transparent common electrode that is arranged on a viewing side of the supporting body and common to the plural cells and composed of plural individual electrodes that are positioned on a side opposite to the common electrode via the cells and provided for each of the cells, and
the individual electrodes are composed of two types of electrodes including a first electrode having a relatively small surface area and a second electrode having a relatively large surface area.

4. The display device according to claim 3, displaying, when the voltage or the current is applied to the opposing electrodes, different hues corresponding to states including
a first state in which the first particles are positioned closer to the common electrode than the second particles,
a second state in which the second particles are positioned closer to the common electrode than the first particles,
a third state in which the first particles are positioned close to the first electrode and the second particles are positioned close to the second electrode,
a fourth state in which the second particles are positioned close to the first electrode and the first particles are positioned close to the second electrode, and
intermediate states between the four mutual states of the first through fourth states.

5. The display device according to claim 2, wherein the plural cells include three types of cells comprising:
a first cell encapsulating
A-particles as the first particles,
B-particles as the second particles that have the property of absorbing light of a first specific wavelength range in the visible range and scattering light of ranges other than the first specific wavelength range and are charged to the polarity opposite to the polarity of the A-particles, and
the dispersion medium that has the property of allowing the light of the first specific wavelength range absorbed by the B-particles to pass through and absorbing the light of the ranges other than the first specific wavelength range;
a second cell encapsulating
C-particles as the first particles,
D-particles as the second particles that have the property of absorbing light of a second specific wavelength range in the visible range and scattering light of ranges other than the second specific wavelength range and are charged to the polarity opposite to the polarity of the C-particles, and
the dispersion medium that has the property of allowing the light of the second specific wavelength range absorbed by the D-particles to pass through and absorbing the light of the ranges other than the second specific wavelength range; and
a third cell encapsulating
E-particles as the first particles,
F-particles as the second particles that have the property of absorbing light of a third specific wavelength range in the visible range and scattering light of ranges other than the third specific wavelength range and charged to the polarity opposite to the polarity of the E-particles, and
the dispersion medium that has the property of allowing the light of the third specific wavelength range absorbed by the F-particles to pass through and absorbing the light of the ranges other than the third specific wavelength range.

6. The display device according to claim 5, wherein
the opposing electrodes are composed of a transparent common electrode that is arranged on a viewing side of the supporting body and common to the three types of the cells and composed of plural individual electrodes that are positioned on a side opposite to the common electrode via the cells and provided for each of the cells, and
the individual electrodes are composed of two types of electrodes including a first electrode having a relatively small surface area and a second electrode having a relatively large surface area.

7. The display device according to claim 6, determining hues of the display device by combining any three states of four states and intermediate states between the four states in each of the three types of the cells;
wherein
the display device creates, when the voltage or the current is applied to the opposing electrodes in the first cell, any of the states including
a first state in which the A-particles are positioned closer to the common electrode than the B-particles,
a second state in which the B-particles are positioned closer to the common electrode than the A-particles,
a third state in which the A-particles are positioned close to the first electrode and the B-particles are positioned close to the second electrode,
a fourth state in which the B-particles are positioned close to the first electrode and the A-particles are positioned close to the second electrode, and
the intermediate states between the four mutual states of the first through fourth states;
wherein
the display device creates, when the voltage or the current is applied to the opposing electrodes in the second cell, any of the states including
a fifth state in which the C-particles are positioned closer to the common electrode than the D-particles,
a sixth state in which the D-particles are positioned closer to the common electrode than the C-particles,
a seventh state in which the C-particles are positioned close to the first electrode and the D-particles are positioned close to the second electrode,
an eighth state in which the D-particles are positioned close to the first electrode and the C-particles are positioned close to the second electrode, and
the intermediate states between the four mutual states of the fifth through eighth states; and
wherein
the display device creates, when the voltage or the current is applied to the opposing electrodes in the third cell, any of the states including
a ninth state in which the E-particles are positioned closer to the common electrode than the F-particles,
a tenth state in which the F-particles are positioned closer to the common electrode than the E-particles,
an eleventh state in which the E-particles are positioned close to the first electrode and the F-particles are positioned close to the second electrode, a twelfth state in which the F-particles are positioned close to the first electrode and the E-particles are positioned close to the second electrode, and the intermediate states between the four mutual states of the ninth through twelfth states.

8. An electrophoretic liquid comprising:

first particles that have a property of scattering light over an entire visible range and positively or negatively charged;

second particles that have a property of absorbing light of a specific wavelength range in the visible range and are charged to a polarity opposite to a polarity of the first particles;

third particles that have a property of scattering light over the entire visible range and are charged to a polarity the same as the polarity of the second particles; and a dispersion medium that has a property of allowing the light of the specific wavelength range absorbed by the second particles to pass through and absorbing light of ranges other than the specific wavelength range; wherein the first particles, the second particles, and the third particles are dispersed in the dispersion medium.

9. A display device comprising:

plural cells that are arranged on a supporting body or arranged in the supporting body and encapsulate the electrophoretic liquid according to claim 8; and opposing electrodes to which a voltage or a current is applied so that the first particles, the second particles, and the third particles are moved in the cells.

10. The display device according to claim 9, wherein the opposing electrodes are composed of a transparent common electrode that is arranged on a viewing side of the supporting body and common to the plural cells and composed of plural individual electrodes that are positioned on a side opposite to the common electrode via the cells and provided for each of the cells, and the individual electrodes are composed of two types of electrodes including a first electrode having a relatively small surface area and a second electrode having a relatively large surface area.

11. The display device according to claim 10, displaying, when the voltage or the current is applied to the opposing electrodes, different hues corresponding to states including a first state in which the first particles are positioned closer to the common electrode than the second particles and the third particles, a second state in which the second particles and the third particles are positioned closer to the common electrode than the first particles, a third state in which the first particles are positioned close to the first electrode and the second particles and the third particles are positioned close to the second electrode, a fourth state in which the second particles and the third particles are positioned close to the first electrode and the first particles are positioned close to the second electrode, and intermediate states between the four mutual states of the first through fourth states.

12. The display device according to claim 9, wherein the plural cells include three types of cells comprising:

a first cell encapsulating a-particles as the first particles, b-particles as the second particles that have the property of absorbing light of a first specific wavelength range in the visible range and are charged to the polarity opposite to the polarity of the a-particles, c-particles as the third particles, and the dispersion medium that has the property of allowing the light of the first specific wavelength range absorbed by the b-particles to pass through and absorbing the light of the ranges other than the first specific wavelength range;

a second cell encapsulating d-particles as the first particles, e-particles as the second particles that have the property of absorbing light of a second specific wavelength range in the visible range and are charged to the polarity opposite to the polarity of the d-particles, f-particles as the third particles, and the dispersion medium that has the property of allowing the light of the second specific wavelength range absorbed by the e-particles to pass through and absorbing the light of the ranges other than the second specific wavelength range; and a third cell encapsulating g-particles as the first particles, h-particles as the second particles that have the property of absorbing light of a third specific wavelength range in the visible range and are charged to the polarity opposite to the polarity of the g-particles, i-particles as the third particles, and the dispersion medium that has the property of allowing the light of the third specific wavelength range absorbed by the h-particles to pass through and absorbing the light of the ranges other than the third specific wavelength range.

13. The display device according to claim 12, wherein the opposing electrodes are composed of a transparent common electrode that is arranged on a viewing side of the supporting body and common to the three types of the cells and composed of plural individual electrodes that are positioned on a side opposite to the common electrode via the cells and provided for each of the cells, and the individual electrodes are composed of two types of electrodes including a first electrode having a relatively small surface area and a second electrode having a relatively large surface area.

14. The display device according to claim 13, determining hues of the display device by combining any three states of four states and intermediate states between the four states in each of the three types of the cells, wherein the display device creates, when the voltage or the current is applied to the opposing electrodes in the first cell, any of the states including a first state in which the a-particles are positioned closer to the common electrode than the b-particles and the c-particles, a second state in which the b-particles and the c-particles are positioned closer to the common electrode than the a-particles, a third state in which the a-particles are positioned close to the first electrode and the b-particles and the c-particles are positioned close to the second electrode, a fourth state in which the b-particles and the c-particles are positioned close to the first electrode and the a-particles are positioned close to the second electrode, and the intermediate states between the four mutual states of the first through fourth states;

wherein the display device creates, when the voltage or the current is applied to the opposing electrodes in the second cell, any of the states including a fifth state in which the d-particles are positioned closer to the common electrode than the e-particles and the f-particles, a sixth state in which the e-particles and the f-particles are positioned closer to the common electrode than the d-particles, a seventh state in which the d-particles are positioned close to the first electrode and the e-particles and the f-particles are positioned close to the second electrode, an eighth state in which the e-particles and the f-particles are positioned close to the first electrode and the d-particles are positioned close to the second electrode, and the intermediate states between the four mutual states of the fifth through eighth states; and wherein the display device creates, when the voltage or the current is applied to the opposing electrodes in the third cell, any of the states including a ninth state in which g-particles are positioned closer to the common electrode than the h-particles and the i-particles, a tenth state in which the h-particles and the i-particles are positioned closer to the common electrode than the g-particles, an eleventh state in which the g-particles are positioned close to the first electrode and the h-particles and the i-particles are positioned close to the second electrode, a twelfth state in which the h-particles and the i-particles are positioned close to the first electrode and the g-particles are positioned close to the second electrode, and the intermediate states between the four mutual states of the ninth through twelfth states.

\* \* \* \* \*